US011900385B1

(12) United States Patent
Sharma et al.

(10) Patent No.: US 11,900,385 B1
(45) Date of Patent: Feb. 13, 2024

(54) COMPUTERIZED-METHOD AND SYSTEM FOR PREDICTING A PROBABILITY OF FRAUDULENT FINANCIAL-ACCOUNT ACCESS

(71) Applicant: Actimize LTD., Ra'anana (IL)

(72) Inventors: Shubhanshu Sharma, Greater Noida (IN); Danny Butvinik, Haifa (IL); Gabrielle Azoulay, Bat Yam (IL)

(73) Assignee: ACTIMIZE LTD., Ra'anana (IL)

( * ) Notice: Subject to any disclaimer, the term of this patent is extended or adjusted under 35 U.S.C. 154(b) by 52 days.

(21) Appl. No.: 17/899,635

(22) Filed: Aug. 31, 2022

(51) Int. Cl.
*G06Q 40/00* (2023.01)
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ..... G06Q 20/40; G06Q 20/4016; G06N 20/00
USPC ................................................. 705/4, 35–45
See application file for complete search history.

(56) References Cited

U.S. PATENT DOCUMENTS

| 10,970,719 | B2 | 4/2021 | Li | |
|---|---|---|---|---|
| 2017/0109406 | A1* | 4/2017 | Chavan | G06F 16/24561 |
| 2018/0033009 | A1* | 2/2018 | Goldman | G06Q 20/4016 |
| 2018/0089261 | A1* | 3/2018 | Li | G06F 16/2453 |
| 2021/0192524 | A1 | 6/2021 | Saleh et al. | |
| 2022/0036302 | A1* | 2/2022 | Cella | G06N 20/00 |
| 2022/0129785 | A1* | 4/2022 | Vogeti | G06N 20/00 |
| 2022/0129787 | A1* | 4/2022 | Vogeti | G06N 20/00 |
| 2022/0180368 | A1* | 6/2022 | Immaneni | G06Q 20/4016 |
| 2022/0198338 | A1* | 6/2022 | Neumann | G06N 20/00 |
| 2022/0327541 | A1* | 10/2022 | Seguritan | G06Q 20/4016 |
| 2022/0405775 | A1* | 12/2022 | Siebel | G06Q 30/01 |
| 2023/0055277 | A1* | 2/2023 | Gallardo | G16H 40/20 |

* cited by examiner

*Primary Examiner* — Eric T Wong
*Assistant Examiner* — Mohammed H Mustafa
(74) *Attorney, Agent, or Firm* — SOROKER AGMON NORDMAN RIBA; Liat Lin

(57) ABSTRACT

A computerized-method for predicting a probability of fraudulent financial-account access, is provided herein. The computerized-method includes a. building a Machine Learning (ML) sequence model; b. implementing a forward-propagation-routine in an encapsulated environment that runs applications to mimic a process of the ML sequence model. The forward-propagation-routine is mimicking processing of a chronical-sequence of a preconfigured number of non-financial activities sequence vector, layer by layer to generate a fraud probability score and using weights and biases which were extracted from each layer of the trained ML sequence model; and c. exporting the extracted weights, biases to a persistent storage and converting the forward propagation routine to an executable for integration with a Fraud Management System that is operating the integrated executable to predict a probability of fraudulent financial-account access by providing a fraud probability score to each chronical-sequence of a preconfigured number of non-financial activities.

14 Claims, 20 Drawing Sheets

| Online Banking Initiated | Account Number Unmasked | Customer Information Update | Password Reset – Request | New Account Apply | Change Phone Number | Change Address | Add Additional User | Change E-mail Address | Card Activation | RDC Item Add Success | Debit Card Locked by User | Debit Card Unlocked by User | Mobile – Unenroll | Credit Card Lost |
|---|---|---|---|---|---|---|---|---|---|---|---|---|---|---|
| | | | | | | | | | | | | | | |

Figure 13

COMPUTERIZED-METHOD AND SYSTEM FOR PREDICTING A PROBABILITY OF FRAUDULENT FINANCIAL-ACCOUNT ACCESS

TECHNICAL FIELD

The present disclosure relates to the field of fraud management by a supervised machine learning model development and more specifically, a supervised machine learning model development for a real-time prediction of a probability of fraudulent financial-account access.

BACKGROUND

Each financial fraud attack has three distinct stages (i) access; (ii) execution; and (iii) monetization. In the access stage, the fraudster tries to gain access to the account of the victim at a financial institution. The fraudster adopts miscellaneous techniques to get illegitimate access to the victim's account using online channels, i.e., mobile browser, PC or laptop, and exploitation of mobile banking application via Application Programming Interfaces (API)s.

The type of activities performed during the access stage involves login from the fraudster's device or hacking into the victim's device, enrolling for account services, and information changes. Such type of account service activities may be for example, initiating online banking, registering a new device, resetting the account login password, changing email address, etc.

In addition to the aforementioned examples of the type of activities, there are other indications of suspicious activities on the account, such as login from an implausible geo-location, usage of a new or suspicious device and activity performed while connected to a risky Internet Service Provider (ISP). For example, a remote access scam to a vulnerable system. i.e., an ISP with a high rate of fraudulent transactions due to poor monitoring of data packet sniffing over the network or an ISP that allows an easy breakthrough in victim's system, such as anonymization of fraudster's connection.

There is a growth in digital onboardings for customers of Financial Institutions (FI)s which has opened multiple avenues for fraudsters to steal money via sophisticated attacks. During the COVID-19 pandemic, financial institutions all around the globe have reported multi-million-dollar losses resulting from online payment frauds.

Therefore, monetary execution or fund transfer may be challenged in real time and may fail preventing fraudulent money losses when a fraudulent transaction has different characteristics than previous activities and allow fraudulent money transfers when they fail to assess the risk in the monetary transaction. Once the money is lost, the victim has to undergo a painful journey of recollecting the lost funds, often with no success.

Current solutions for detecting fraud are modeled using transactional data focusing on features like the amount of money debited or credited to the customer's account, nature of the beneficiary, branch where the beneficiary holds the account, etc. These models are mostly developed to fight against fraud in the execution stage and they are evaluated in real time since they are aimed to detect and prevent payment fraud in real time. Hence, these models performance is limited to transactional data and predefined aggregated data profiled through domain expertise, so they fail to comprehend sophisticated attacks many times because of limited knowledge of prior history of events.

In addition to the aforementioned limitations, the models of current solutions may sometimes allow fraudulent money transfers if they fail to assess the risk in the monetary transaction. Once the money is lost, the victim has to undergo a painful journey of recollecting the lost funds.

Current solutions require authoring strategy rules to alert on fraudulent transactions by looking into recent history through expert rules. However, authoring a rule for each fraudulent sequence is not scalable and often requires updates to a Strategy Rules Evaluation Engine.

Furthermore, the strategy rules fail to signify the likelihood of fraud and generate results as either negative or affirmative.

A system for fraud prediction should be evaluated in real time because payment fraud detection is a real-time problem. The existing Service-Level Agreement (SLA) with financial institutions abides the vendors to provide a solution that performs fraud detection within 200-250 ms.

Existing solutions which provide an identification of fraudulent transactions through recommendation from a neural network based on past transactions history of the customer, do not provide an early identification of fraud in the access stage by detecting a trail of suspicious activities performed on the account of the financial institution's customer. Current solutions merely leverage monetary execution information of the customer in past, hence leveraging risk indications that are present in monetary transactions only and do not comprehend risk in activities which have been performed before the monetary execution.

Moreover, current solutions do not ensure a fast and efficient fraud detection response time that abides to the SLA of 200 ms, because the applications or frameworks which are used for development of these models are built using Python, which is slower than compiled languages, such as Java and Scala, in real-time applications, since these compiled languages are 25 times faster than Python.

Furthermore, some of the current solutions suggest docker containerization of the fraud detection model for its effective execution. However, an activities sequence in the access stage may vary in size and hence add to the total trip time for evaluation via the container fraud detection model, which increases the total turnaround time for a fraud detection.

Therefore, there is a need for a technical solution for predicting a probability of fraudulent financial-account access.

SUMMARY

There is thus provided, in accordance with some embodiments of the present disclosure, a computerized-method for predicting a probability of fraudulent financial-account access.

In accordance with some embodiments of the present disclosure, the computerized-method includes building a Machine Learning (ML)sequence model. The building of the ML sequence model may be operated by: (i) retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database; (ii) labeling each one or more chronical-sequences as fraud or non-fraud, based on the label of fraud or non-fraud which is associated to each compatible financial-activity that the chronical-sequence has preceded; (iii) providing the labeled one or more chronical-sequences to a data-vectorization model to: (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value; (iv) exporting the dictionary of vector encodings to a persistent storage; and (v) training the ML sequence model to predict fraud in a chronical-sequence vector, based on a sampling, wherein the sampling is the array of vectors.

Furthermore, in accordance with some embodiments of the present disclosure, the computerized-method may further include implementing a forward propagation routine in an encapsulated environment that runs applications to mimic a process of the ML sequence model. The forward propagation routine may mimic processing of a chronical-sequence of a preconfigured number of non-financial activities sequence vector, layer by layer to generate a fraud probability score and using weights and biases which were extracted from each layer of the trained ML sequence model.

Furthermore, in accordance with some embodiments of the present disclosure, the computerized-method may further include exporting the extracted weights, biases, to a persistent storage and converting the forward propagation routine to an executable for integration with a Fraud Management System, in production environment. The Fraud Management System may be operating the integrated executable to predict a probability of fraudulent financial-account access by providing a fraud probability score to each chronical-sequence of a preconfigured number of non-financial activities, provided in real-time.

Furthermore, in accordance with some embodiments of the present disclosure, the preconfigured number of non-financial activities of the chronical-sequence is determined by a Subject Matter Expert (SME) to maintain maximum number of fraudulent activities to access a financial-account by a fraudster or activities operated by a mule.

Furthermore, in accordance with some embodiments of the present disclosure, the ML sequence model may include four layers: (i) Long Short Term Memory (LSTM); (ii) dense Rectified Linear Unit (ReLU); (iii) dropout; and (iv) dense sigmoid. Weights and biases of each layer may be extracted and stored in the persistent storage.

Furthermore, in accordance with some embodiments of the present disclosure, sampling for the training of the ML sequence model may be related to a number and size of vectors of the one or more chronical-sequences in the persistent storage and to the latter preconfigured period. The number of distinct vectors of the one or more chronical-sequences may be a distinct number of financial activity types.

Furthermore, in accordance with some embodiments of the present disclosure, the ML sequence model may be a ML model that is suitable for sequential data.

Furthermore, in accordance with some embodiments of the present disclosure, the computerized-method may further include profiling for each customer the retrieved one or more chronical-sequences of the preconfigured number of non-financial activities performed for each financial-account before conducting a financial activity during a latter preconfigured period to limit the preconfigured number of non-financial activities.

Furthermore, in accordance with some embodiments of the present disclosure, the computerized-method may further include augmenting the Fraud Management System for early fraud detection using the trained ML sequence model.

Furthermore, in accordance with some embodiments of the present disclosure, a recent chronical-sequence of a preconfigured number of non-financial activities performed on a financial-account before conducting a real-time financial activity of a customer may be provided to the Fraud Management System for: (i) enriching the real-time financial activity by pulling data from the customer's profile; (ii) encoding each non-financial activity according to the dictionary of vector encodings by an activity encoder module; and (iii) creating an any of vectors ordered based on the provided chronical-sequence of the preconfigured number of non-financial activities performed on the financial-account.

Furthermore, in accordance with some embodiments of the present disclosure, the fraud probability score may be used by a risk-case management system that is associated to the Fraud Management System for devising a business rule that checks the fraud probability score against a fraud probability threshold value, through the ML sequence model and decides whether a financial activity should be alerted or passed without any further investigation.

Furthermore, in accordance with some embodiments of the present disclosure, weights and biases of a re-tuned ML sequence model may replace weights and biases of the ML sequence model that is running in production environment to improve accuracy of the ML sequence model that is operating in the Fraud Management System in production environment.

Furthermore, in accordance with some embodiments of the present disclosure, when the fraud probability score is above a predefined threshold, the Fraud Management System may not allow a user to proceed to conduct a financial activity in the customer account.

Furthermore, in accordance with some embodiments of the present disclosure, converting to the executable of forward propagation routine may be implemented in a programming language. The programming language may be any selected programming language such as Java, Scala or any other programming language.

Furthermore, in accordance with some embodiments of the present disclosure, a computerized-system for predicting a probability of fraudulent financial-account access is provided herein.

Furthermore, in accordance with some embodiments of the present disclosure, the computerized-system may include a memory to store a customers-account database and a persistent storage and one or more processors. The one or more processors may be configured to: a. build a Machine Learning (ML) sequence model by (i) retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database; (ii) labeling each one or more chronical-sequences as fraud or non-fraud, based on the label of fraud or non-fraud which is associated to each compatible financial-activity that the chronical-sequence has preceded, (iii) providing the labeled one or more chronical-sequences to a data-vectorization model to: (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value; (iv) exporting the dictionary of vector encodings to the persistent storage; and (v) training the ML sequence model to predict fraud in a chronical-sequence vector, based on a sampling, wherein the sampling is the array of vectors.

Furthermore, in accordance with some embodiments of the present disclosure, the one or more processors may be further configured to implement a forward propagation routine in an encapsulated environment that runs applications to mimic a process of the ML sequence model. The forward propagation routine may mimic a process of a chronical-sequence of a preconfigured number of non-financial activities sequence vector, layer by layer to generate a fraud probability score and extracting weights and biases from each layer of the trained ML sequence model.

Furthermore, in accordance with some embodiments of the present disclosure, the one or more processors may be further configured to export the extracted weights, biases and convert the forward propagation routine to an executable for integration with a Fraud Management System, in a production environment. The Fraud Management System may operate the integrated executable to predict a probability of fraudulent financial-account access by providing a fraud probability score to each chronical-sequence of a preconfigured number of non-financial activities, provided in real-time.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

FIG. 13 is an example of non-monetary activities in a chronical-sequence of a preconfigured number of non-financial activities performed on each financial-account before conducting a financial activity during a latter preconfigured period, in accordance with some embodiments of the present disclosure:

DETAILED DESCRIPTION

Figure 1A:
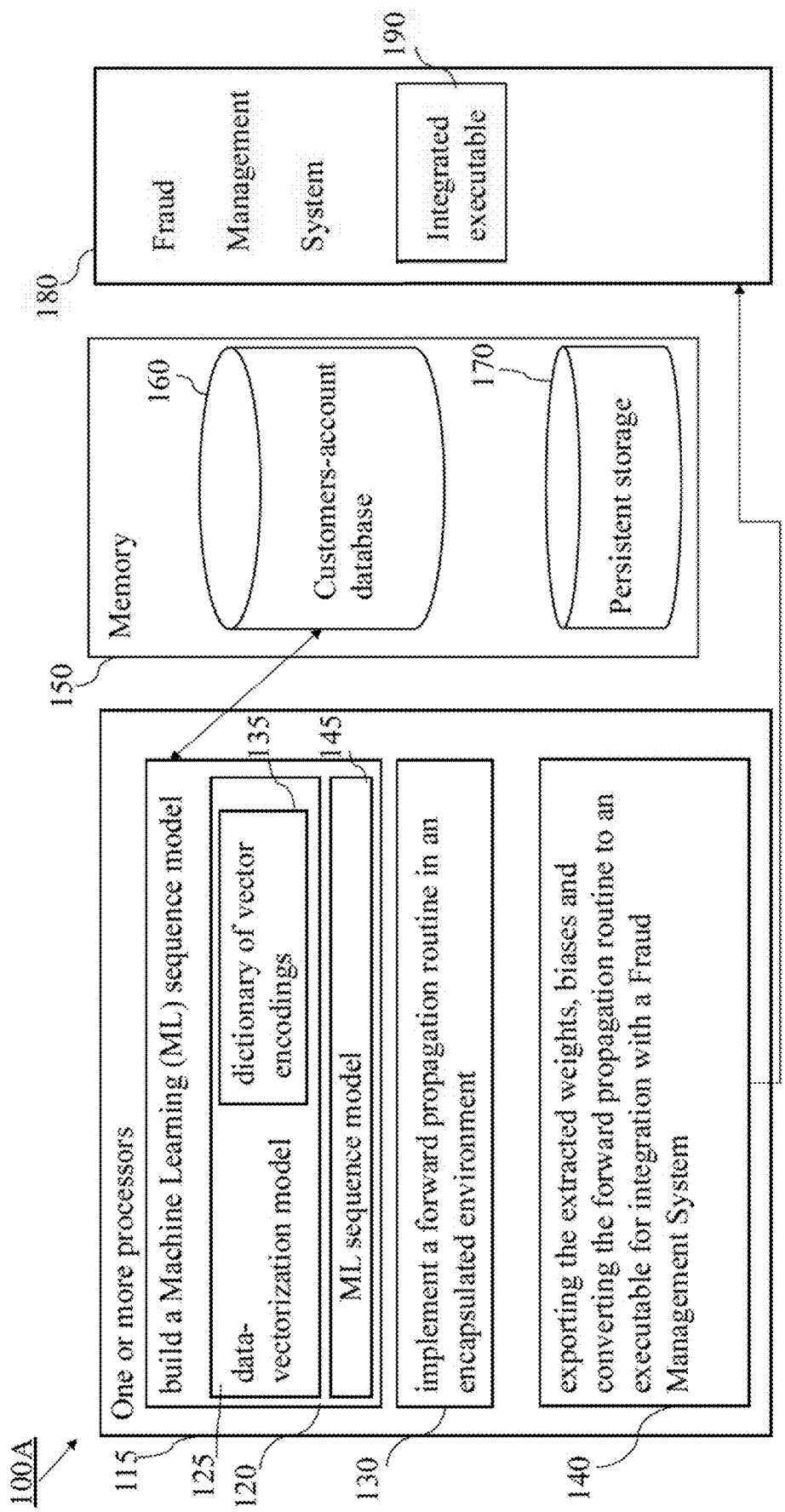
FIG. 1A schematically illustrates a high-level diagram of a system for predicting a probability of fraudulent financial-account access, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Artificial Neural Networks (ANN)s, are computing systems which are based on a collection of connected units or nodes called artificial neurons. Each connection can transmit a signal to other neurons. An artificial neuron receives signals and then processes them and can signal neurons connected to it.

Long-Short-Term-Memory (LSTM) is an artificial neural network used in the fields of artificial intelligence and deep learning. Unlike standard feedforward neural networks. LSTM has feedback connections. Such a recurrent neural network can process not only single data points, such as images, but also entire sequences of data, such as speech or video.

LSTM is suitable for training and predicting on sequential data. i.e., data that has implicit relation with respect to the chronological occurrence of events in order. Current solutions for integration of an LSTM model in real-time Fraud Management Systems require docker containerization of the Python-based LSTM model. However, an activities sequence may vary in size and hence add to the total trip time for evaluation via the containerized model, which increases the total turnaround time for fraud detection. Thus, current solutions may not conform to standard service level agreement for every fraud detection solution is to return a detection response within 200 ms.

Commonly, Python is a choice of programming language for ML model development for many reasons such as great number of available packages or frameworks online that helps with the model development and available toolsets for ML model development and research. But for deployment in production environment or integration of the models in real time production systems, the engineering would prefer a solution built on a more scalable programming language like Java. That is why, the Python based models built in lab may be converted to a form that is either written in Java or easily read by a Java code Scala or any other code.

Furthermore, Python-based implementation of deep learning models although containerized, are expected to perform sub-optimally in high-load production systems in real-time. A Python ML model is heavy because of multiple functions or attributes that it embodies which are required in lab for model training, exploration, visualization of content, but not required for model evaluation for score. Therefore, there is a need to improve the deployment of a Machine Learning (ML) model that has been developed in Python.

Moreover, since models of existing solutions are provided with transactional data and predefined aggregated data profiled only in the training stage, through domain expertise, they do not analyze the access stage events, and thus, many times fail to comprehend sophisticated attacks, due to this limited knowledge of the access stage.

The drawback of analyzing the access stage, e.g., the prior history of events, by existing solutions is that it may require authoring strategy rules to alert on fraudulent transactions by looking into the recent history through expert rules. However, authoring a rule for each fraudulent sequence is not scalable and often consumes resources since it requires updates to the strategy rules evaluation engine.

Furthermore, the strategy rules fail to signify the likelihood or probability of fraud and generate results as either negative or affirmative. This is a disadvantage because the financial institution may not be able to configure a threshold according to the capacity to analyze each transaction having a probability above the configured threshold to be fraud and may not have the ability to control the amount of probable fraud transactions that should be analyzed.

The term "mule", as used herein, refers to someone who transfers illegally acquired money on behalf of someone else. Criminals recruit money mules to launder money that has been retained from online scams and frauds or crimes like human trafficking and drug trafficking, thus hiding the identity of the criminal and location from the victim of the crime and the authorities. For example, by using instant payment mechanisms, the mule allows the criminal to transform a reversible and traceable transaction into an irreversible and untraceable one. In another example, when a third party's bank details have been compromised, they may be used as a mule without their knowledge.

Therefore, there is a need in the art for a technical solution for detecting fraud before the execution stag, e.g., before a payment fraud is conducted, by detecting the fraud in the access stage by using an action sequence, such as a chronical-sequence of a preconfigured number of non-financial activities, such as information present generally in text, like 'change in password', 'registering a new device', performed on each financial-account before conducting a financial activity.

FIG. 1A schematically illustrates a high-level diagram of a system 100A for predicting a probability of fraudulent financial-account access, in accordance with some embodiments of the present disclosure.

According to some embodiments of the present disclosure, a system such as system 100A may include a memory 150 to store a customers-account database 160 and one or more processors 115.

According to some embodiments of the present disclosure, the one or more processors may be configured to: a. build a Machine Learning (ML) sequence model 120; b. implement a forward propagation routine in an encapsulated environment 130; and c. export the extracted weights, biases and convert the forward propagation routine to an executable for integration with a Fraud Management System 140. For example, system 100B in FIG. 1B and system 1400 in FIG. 14. The forward propagation routine may be implemented in any programming language and in a docker container or not.

Figure 15A:
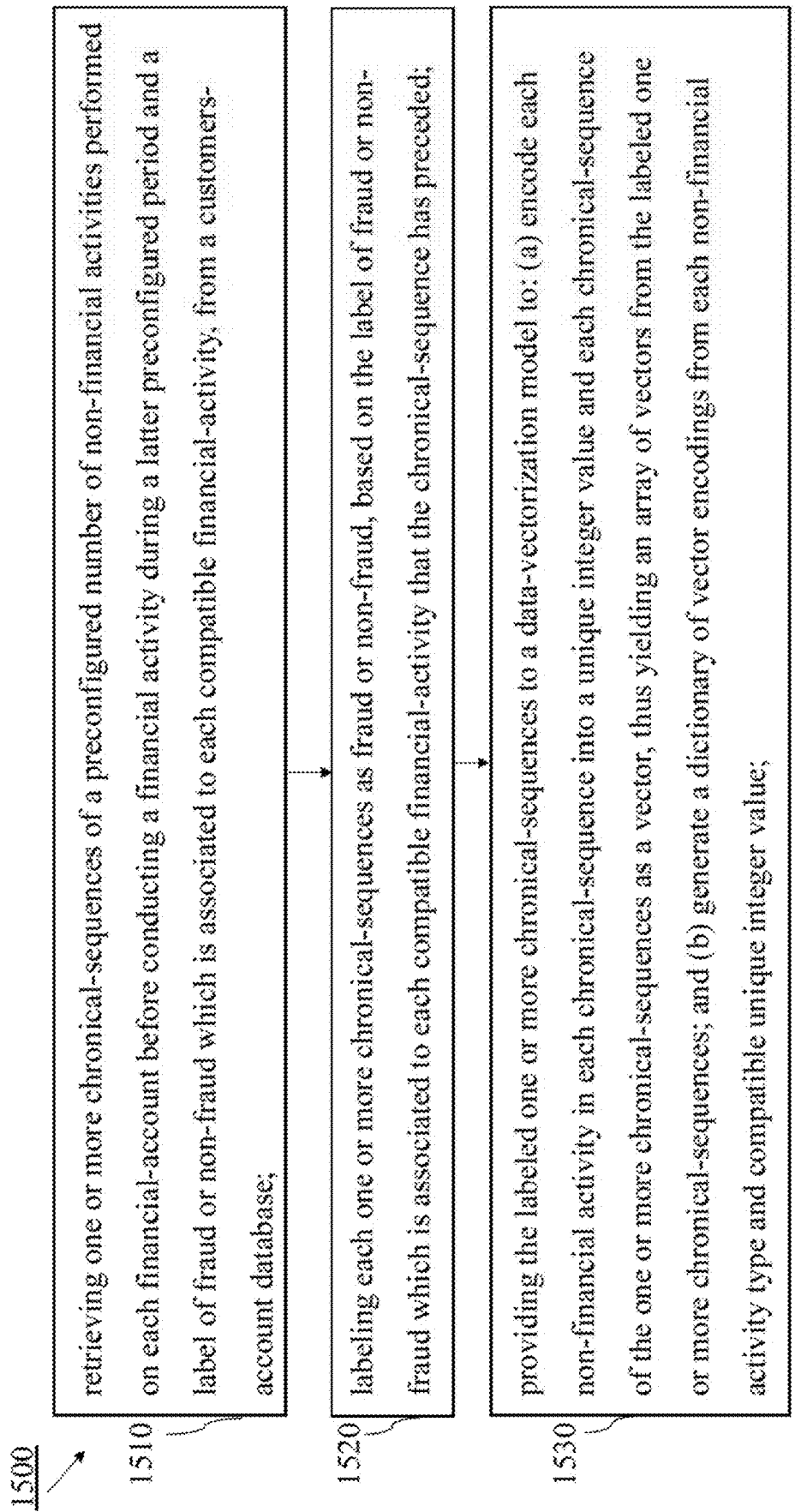
FIGS. 15A-15B are a high-level workflow of an operation of building a Machine Learning (ML) sequence model, in accordance with some embodiments of the present disclosure.
Figure 15B:
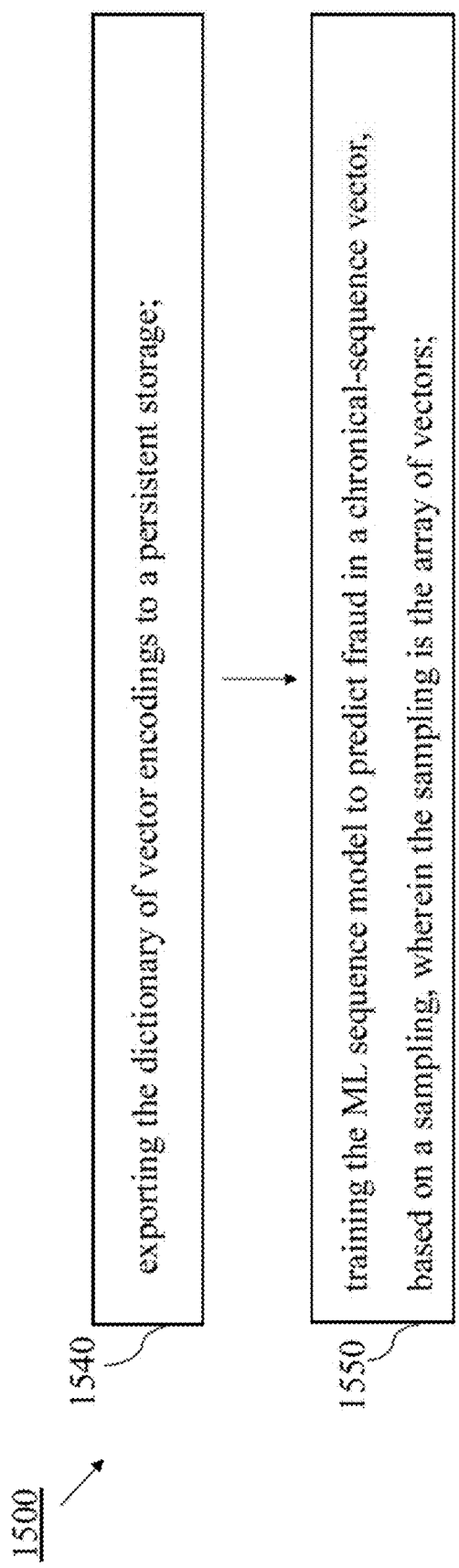

According to some embodiments of the present disclosure, the operation of building an ML sequence model 120, such as operation of building an ML sequence model 1500 in FIG. 15A-15B, may include retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database 160. The retrieved one or more chronical-sequences of a preconfigured number of non-financial activities may be for example such as non-monetary activity sequences for customer 'C' 201 in FIG. 2.

According to some embodiments of the present disclosure, building of the ML sequence model may be by using Python libraries such as Keras and Tensorflow, in the lab. After the development of ML sequence model, there are several ways to export it to the production system, either in form of Pickle, i.e., Python executable, similar to JAR which is executable in Java or docker containers. However, these two approaches embed technical challenges. When using Pickle, if the production system is built on any other programming language than Python, which is the case for 99% production system because Python is slow and does not scale efficiently in real-time heavy load production systems, then Pickle cannot be integrated because of a mismatch between underlying programming languages. Fraud prevention systems have to operate in real time and hence they are built generally in Java or Scala which adapt easily to the real-time performance requirements. When using a Container technology, such a docker container technology which is a solution to allow running Python code in conjunction with production system, even if production system is running on a different programming language it may also suffer from several technical issues.

One technical issue is that the docker container functions in parallel with production system and both these components interact over the network by API calls. An array of activities sequence that needs to be forwarded to the ML model for its execution, when the ML model is in docker container, the production system is required to forward the whole activities sequence e.g., chronical-sequences over the network to the container. Depending on the size of the vector or array of vectors, the total trip time of the request to the ML model and retrieval of the response, e.g., fraud probability score from ML model, can be significantly huge and could lead to extended fraud detection time of the real time transaction, hence exceeding the SLA of 200 ms. Another technical issue may be that the underlying implementation of a docker container is a Python based model which is not as effective in terms of real time execution performance Java based docker container applications.

According to some embodiments of the present disclosure, the operation of building an ML sequence model 120 may further include labeling each one or more chronical-sequences as fraud or non-fraud, based on the label of fraud or non-fraud which is associated to each compatible financial-activity that the chronical-sequence has preceded.

Figure 3:
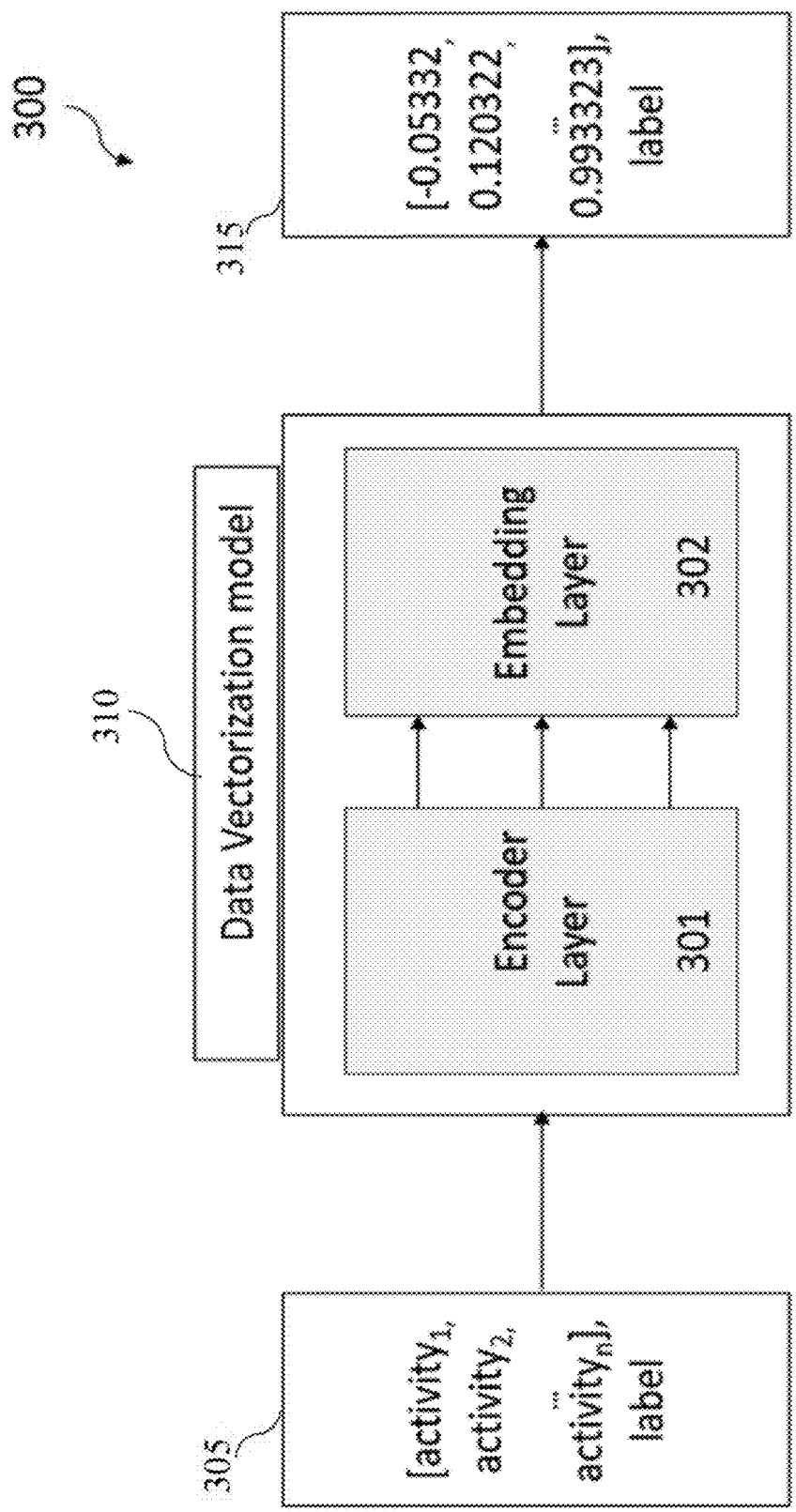
FIG. 3 is a system diagram of data-vectorization model that performs the vectorization of activities sequence data, in accordance with some embodiments of the present disclosure.

According to some embodiments of the present disclosure, the operation of building an ML sequence model 120 to yield an ML sequence model 145 may further include providing the labeled one or more chronical-sequences to a model, such as data-vectorization model 125, and such as data-vectorization model 310 in FIG. 3. The data-vectorization model 125 may have a encoding layer, such as encoder layer 301 in FIG. 3 and such as encoder layer 401 in FIG. 4 to encode each non-financial activity in each chronical-sequence, such as non-financial activities of chronical-sequence 305 in FIG. 3, into a unique integer value as shown by element 410 in FIG. 4, and then converting each chronical-sequence of integer-encoded activities sequence to any of vectors as shown by element 315 in FIGS. 3 and 420 in FIG. 4, thus yielding an array of vectors from the labeled one or more chronical-sequences.

According to some embodiments of the present disclosure, for example, when there are 10 sequences in the data that comprise of 50 distinct non-financial activities type occurring in different combinations across 10 sequences. The data-vectorization model 125 may generate a vector value for each type of the 50 distinct activity types, hence creating a dictionary of an activity type and vector value combination in memory. The activity type may be in text format or any other format.

According to some embodiments of the present disclosure, the generated dictionary of vector encodings 135 for each activity type may be exported from the memory to a persistent storage such as a text file for later deployment into a Fraud Management System 180, such as for example, system 100B in FIG. 1B and system 1400 in FIG. 14. The deployment of the ML sequence model may be improved by the implementation of the forward propagation routine. The logic behind the forward propagation routine is based on that underneath the Python based ML sequence model, it is mathematical computations fundamentally.

Figure 17A:
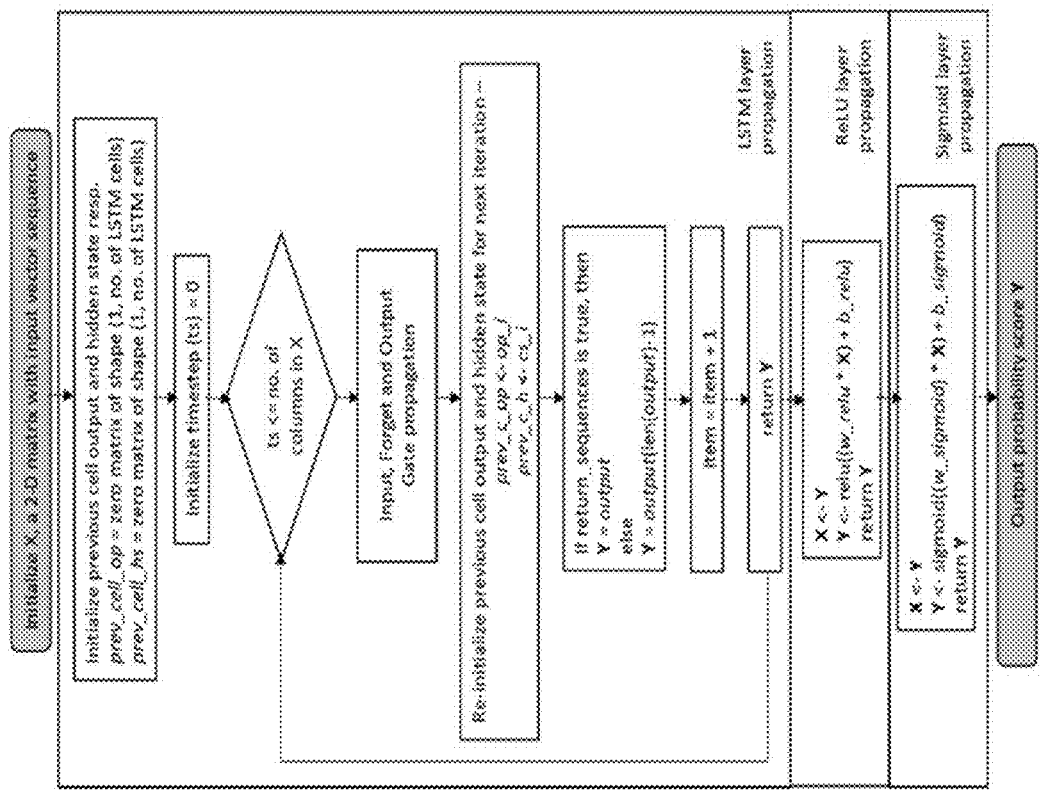
FIGS. 17A-17B are a high-level workflow of a forward propagation routine, in accordance with some embodiments of the present disclosure.
Figure 17B:
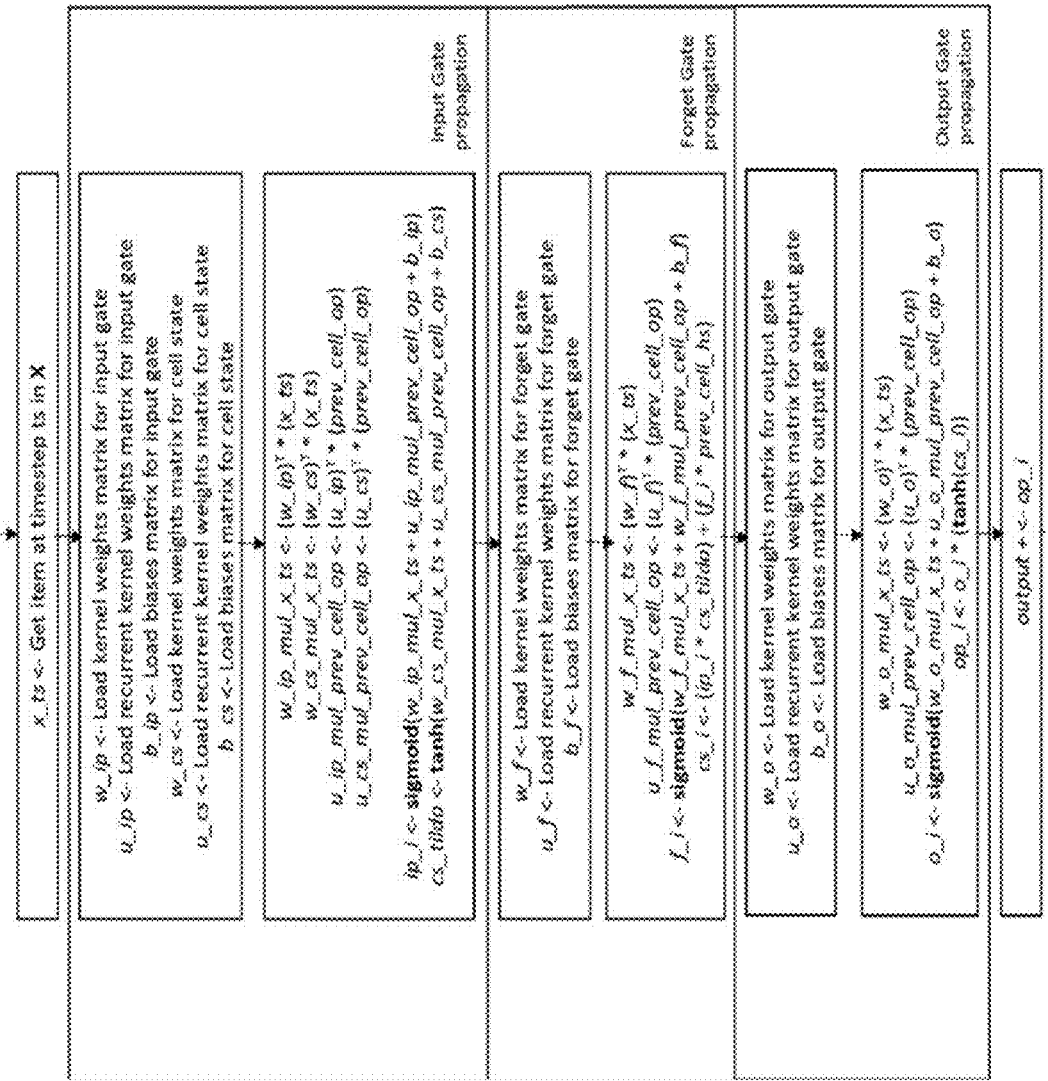

In other words, a Python ML sequence model is merely embodying several instructions which are fundamentally mathematical matrix operations, where input sequence is treated as one matrix, the weights and biases from each layer are different matrices, and the model performs matric operations like multiplications and addition of these matrices, which generate the probability score. As shown in FIGS. 17A-17B, which may be followed to mimic the functioning of the ML sequence model, by implementing the steps in any programming language of choice.

Figure 5:
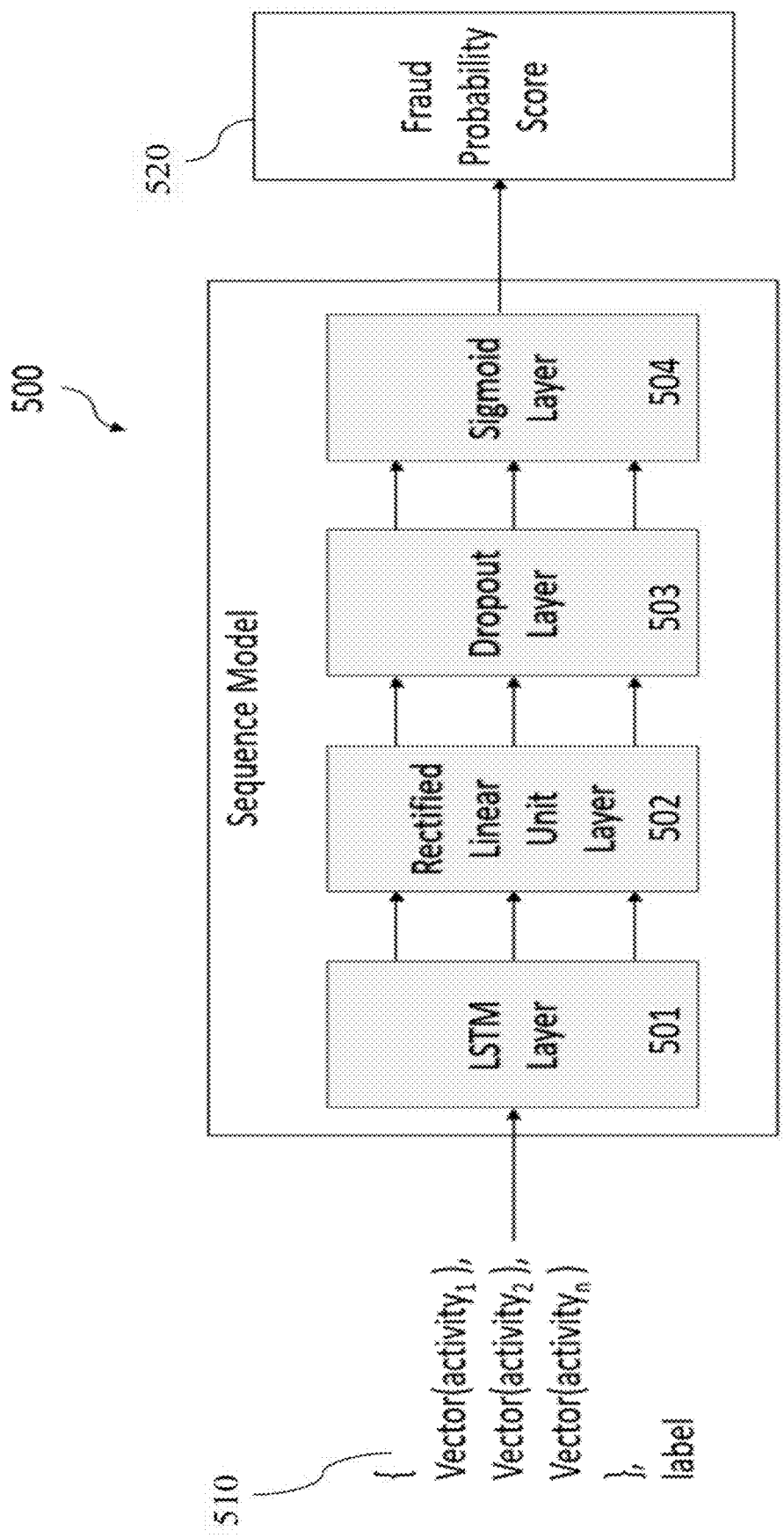
FIG. 5 is a system diagram of an ML sequence model comprising four layers, in accordance with some embodiments of the present disclosure.

According to some embodiments of the present disclosure, the operation of building an ML sequence model 120 may further include exporting the dictionary of vector encodings to a persistent storage 170 e.g., exported in a persistent media like text file and training the ML sequence model to predict fraud in a chronical-sequence vector, based on a sampling, as shown in diagram 500 in FIG. 5. The sampling is the array of vectors.

According to some embodiments of the present disclosure, the implementing of the forward propagation routine in an encapsulated environment 130 may be in an encapsulated environment that runs applications to mimic a process of the ML sequence model. The forward propagation routine may mimic processing of a chronical-sequence of a preconfigured number of non-financial activities sequence vector, layer by layer, where each layer corresponds to a layer or component or level in the ML sequence model to generate a fraud probability score, as shown in diagram 500 in FIG. 5, and may use weights and biases which were extracted from each layer of the trained ML sequence model, as shown in FIG. 17A. The fraud probability score may be a probability of fraudulent financial-account access. The encapsulated environment 130 may be implemented in any programming language and in a docker container or not. Each non-financial activity may be in text format or in any other format.

According to some embodiments of the present disclosure, the forward propagation routine simplifies the functioning of each layer of the ML sequence model by treating the input chronical-sequence, which is fed to it in a form of 2D matrix. The forward propagation routine may mimic each layer of ML sequence model, as shown in FIG. 17A, by performing equivalent matrix operations, such as transpose, multiplication, addition and subtraction, and which can be implemented in any programming language of choice.

According to some embodiments of the present disclosure, when the sequence model is trained in the lab, it computes weights and biases for each layer, which is used to transform the input activities sequence, layer by layer to generate a fraud probability score. In order to mimic the functioning of each layer of the ML sequence model, the forward propagation routine may leverage the weights and biases computed by the ML sequence model, as shown in FIGS. 17A-17B. For this purpose, these weights may be extracted and biases from each layer of the ML sequence model and may be exported to the persistent storage 170.

According to some embodiments of the present disclosure, by implementing the forward propagation routine in any selected programming language, for example in Java, having the mimicked ML sequence model ready, the code may be compiled and converted to an executable, e.g., JAR that can be integrated with Fraud Management System 180 in production. The compiled code in JAR may generate a reference to the weights and biases that have been extracted from each layer of the ML sequence model, the location of which has to be passed as configuration parameter to the Java code.

According to some embodiments of the present disclosure, to integrate the ML sequence model in Fraud Management System 180 in production, so it may interact with the code of the Fraud Management System, such that it may conform to existing Service-Level Agreement (SLA) with financial institutions and perform fraud detection within 200-250 ms, the process of the ML sequence model may be mimicked in a form of mathematical equations that operate on the chronical-sequence of a preconfigured number of non-financial activities sequence vector to generate a probability score. The mimicking process is referred to as the forward propagation routine, in which the input chronical-sequence is processed in forward moving fashion by multiple layers included in the ML sequence model, propagated layer by layer by multiple mathematical equations.

According to some embodiments of the present disclosure, the extracted weights, biases may be exported to a persistent storage and the forward propagation routine may be converted to an executable for integration with the Fraud Management System 180, which may be in production environment.

Figure 1B:
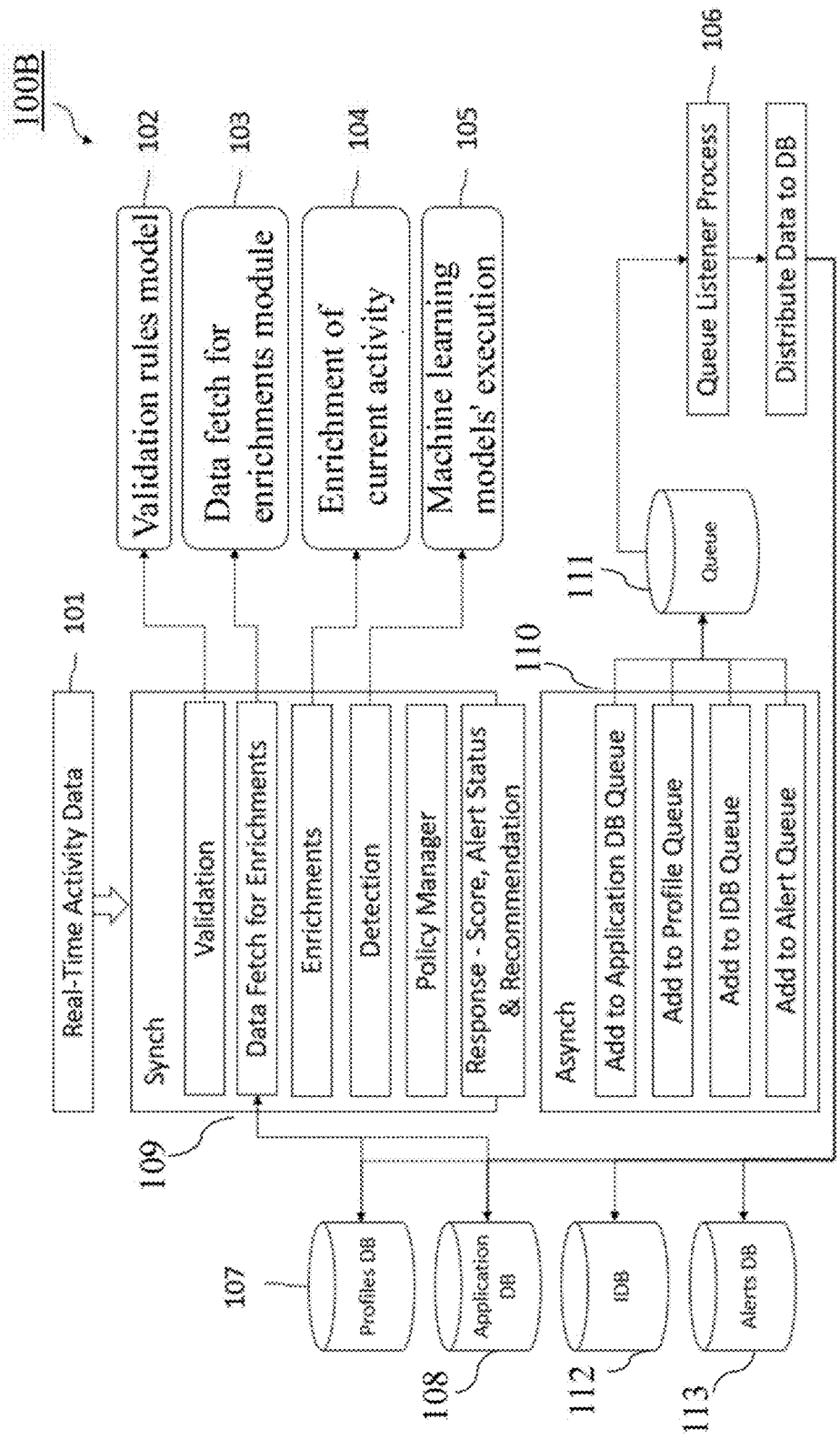
FIG. 1B schematically illustrates a diagram of an integration of one or more embodiments of the current disclosure with a Fraud Management System, in accordance with some embodiments of the present disclosure.
Figure 14:
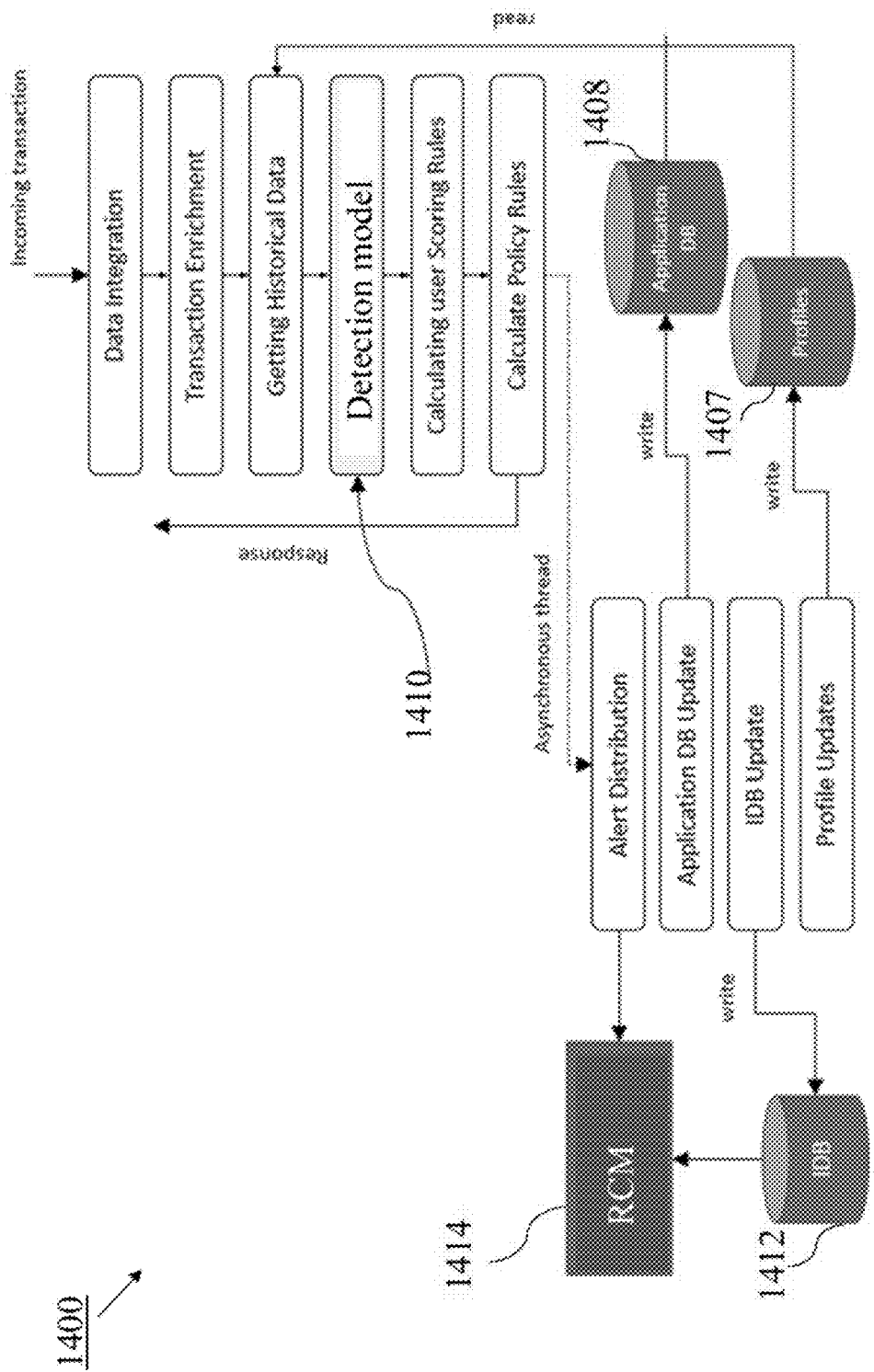
FIG. 14 is a high-level process flow diagram of a Fraud Management System, in accordance with some embodiments of the present disclosure.

According to some embodiments of the present disclosure, the Fraud Management System 180, may be for example, such as Fraud Management System 100B in FIG. 1B and such as Fraud Management System 1400 in FIG. 14, may operate the integrated executable 190 to predict a probability of fraudulent financial-account access by providing a fraud probability score, which may be a probability of fraudulent financial-account access, to each chronical-sequence of a preconfigured number of non-financial activities, which has been provided in real-time. The Fraud Management System 180 may be configured to fetch the non-monetary activities sequence of the customer in real time whenever the system receives an event to detect the incoming transaction from the customer.

Figure 9:
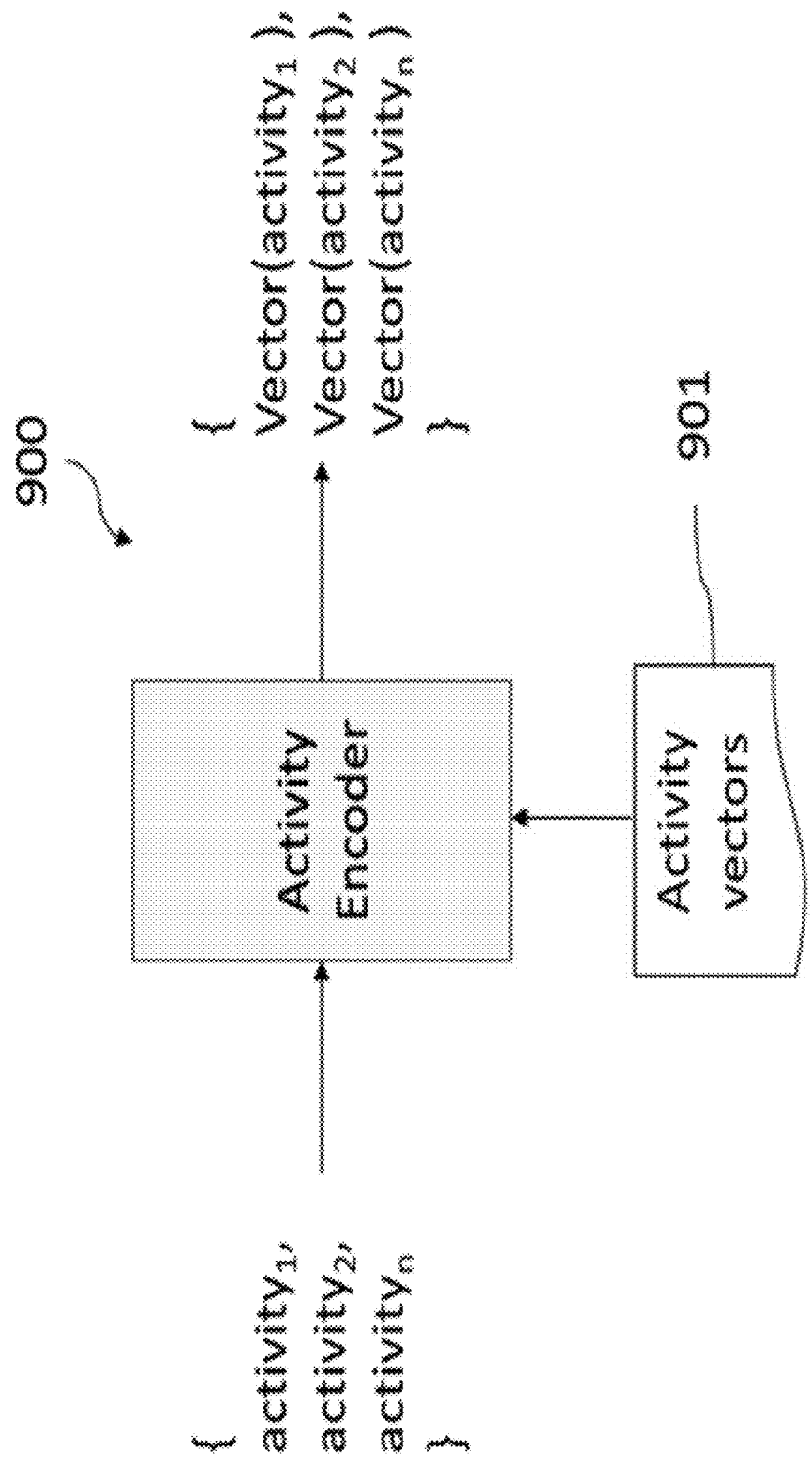
FIG. 9 is a diagrammatic representation of the activity encoder module, in accordance with some embodiments of the present disclosure.

According to some embodiments of the present disclosure, the fetched activities sequence data may be fed to an activity encoder module, such as activity encoder model 900 in FIG. 9, that may be configured in the system that transforms the activities sequence to an array of vectors through look up from the dictionary of vector encodings 135, such as activity vectors 901 in FIG. 9, corresponding to each non-monetary activity type.

According to some embodiments of the present disclosure, the array of vectors may be passed to an implementation, such as Java implementation of an ML sequence model, which predicts and returns a fraud probability score. The score may be used to evaluate strategy rules authored in the Strategy Rules Evaluation Engine to generate alerts for suspicious activities.

According to some embodiments of the present disclosure, when the fraud probability score may be above a predefined threshold, the Fraud Management System 180 does not allow a user to proceed with the conducted financial activity in the customer's account. A fraud probability score above a predefined threshold may indicate that the financial activity is suspected as fraud.

According to some embodiments of the present disclosure, the preconfigured number of non-financial activities of the chronical-sequence may be determined by a Subject Matter Expert (SME) to maintain a maximum number of fraudulent activities to access a financial-account by a fraudster or activities operated by a mule. For example, fraudulent money transfer is preceded by some illegitimate activities in the account by the fraudster in just few hours or days before the fraud execution. This may include multiple logins from implausible geo-location, registering new devices with the account etc. Although the fraudster could have gained access to the account much ahead of time, but still the fraud execution is preceded by some unusual or suspicious activities which is in close proximity to the fraud execution time or date.

According to some embodiments of the present disclosure, the SME may decide what should be lookback into the history, that the system should perform in order to pull non-financial activities performed on the account. This lookback period may be decided as such that allows collection of maximum number of suspicious activities and minimum number of clean activities by studying both fraud and clean transactions history.

Figure 7:
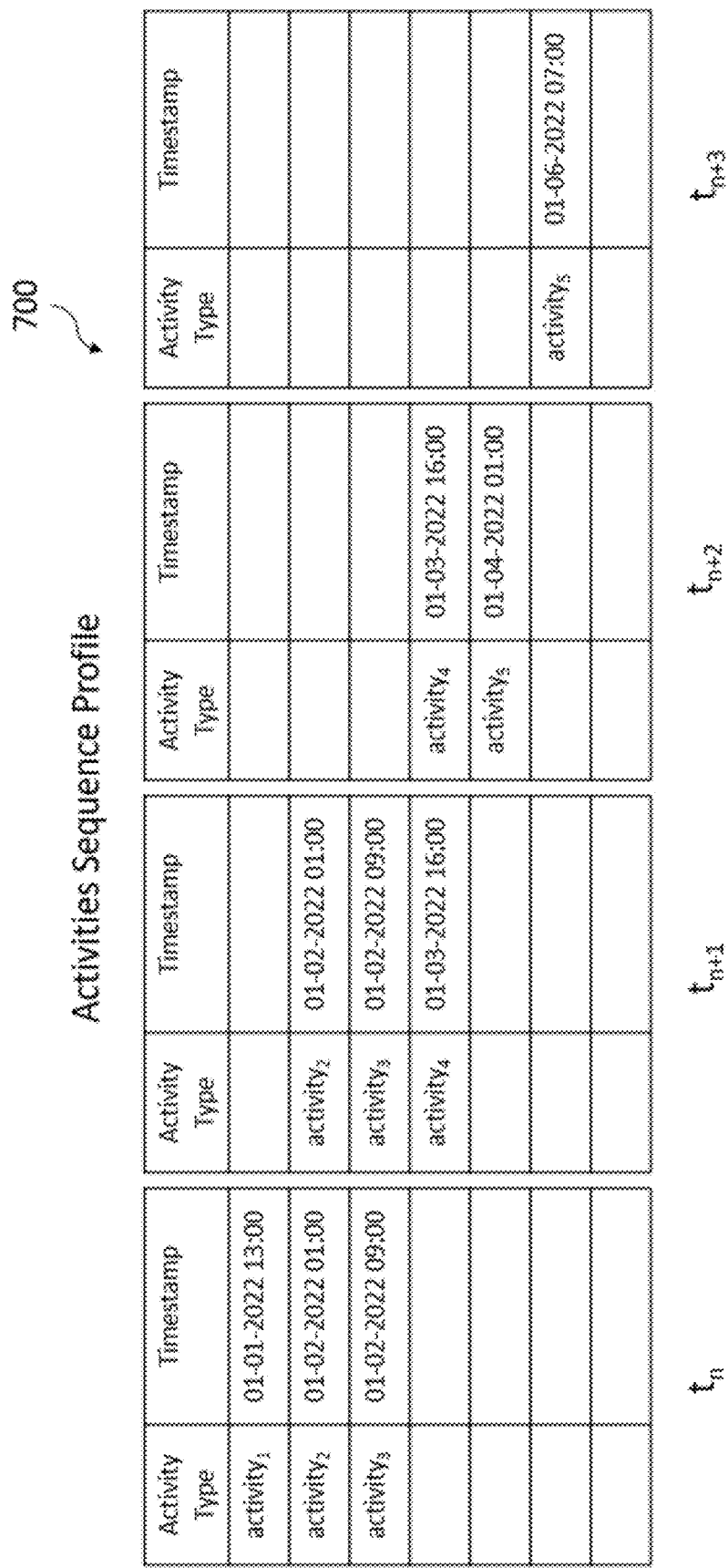
FIG. 7 is a diagrammatic representation of the state of activities sequence profile of a customer over time, in accordance with some embodiments of the present disclosure.

According to some embodiments of the present disclosure, the ML sequence model may include four layers: (i) Long Short Term Memory (LSTM); (ii) dense Rectified Linear Unit (ReLU; (iii) dropout, and (iv) dense sigmoid, as shown in diagram 500 in FIG. 5, and weights and biases of each layer may be extracted and stored in a persistent storage 170. The persistent storage may be imported to a Fraud Management System 180 in production environment. The Fraud Management System 180 may pull the recent non-financial activities type information from the profile database, such as profiles DB 107, and may refer to imported activities vector data from the persistent storage 170 to convert each activity in text format or any other format to a vector and formulate a sequence of activities vector, which then can be fed to the ML sequence model for fraud prediction. The profiles DB 107 may be configured to maintain recent non-monetary activities sequence along with the chronological order for each customer, as shown in FIG. 7.

According to some embodiments of the present disclosure, weights and biases of a re-tuned ML sequence model may replace weights and biases of the ML sequence model that is running in production environment to improve accuracy of the ML sequence model that is operating in the Fraud Management System 180, in production environment.

According to some embodiments of the present disclosure, sampling for the training of the ML sequence model, may be related to a number of vectors of the one or more chronical-sequences in the persistent storage 170 and to the latter preconfigured period. The number of vectors of the one or more chronical-sequences may be a distinct number of financial activity types. The financial activity types may be for example, According to some embodiments of the present disclosure, when building the ML model 120, i.e., data-vectorization model 125, a parameter, e.g., the number of vectors, that may indicate the data-vectorization model 125 what is a maximum number of financial activity types in the data, may be configured. The configured parameter may indicate the data-vectorization model 125 to generate a dictionary of vector encodings 135, where vector values may be calculated such that all vectors of the one or more chronical-sequences are equidistant from each other in the dimensional space.

According to some embodiments of the present disclosure, the LSTM layer has to be configured with a maximum number of non-financial activities in the chronical-sequence and a size of the longest chronical sequence. The configuration to a size of the longest chronical-sequence implies that each sequence has to be transformed to a specified size. The transformation of the chronical-sequence to a specified size may be operated by automatically by the data-vectorization model 125 which may pad '0's to each chronical-sequence which falls shorter in length from the specified size and then the data-vectorization model 125 may encode all the equal-sized sequences.

According to some embodiments of the present disclosure, the ML sequence model may be a ML model that is suitable for sequential data.

According to some embodiments of the present disclosure, the one or more processors 115 may be further configured to profile, for each customer, the retrieved one or more chronical-sequences of the preconfigured number of non-financial activities performed, for each financial-account, before conducting a financial activity during a latter preconfigured period to limit the preconfigured number of non-financial activities.

According to some embodiments of the present disclosure, the one or more processors 115 may be further configured to augment the Fraud Management System 180 for early fraud detection using the trained ML sequence model.

According to some embodiments of the present disclosure, a recent chronical-sequence of a preconfigured number of non-financial activities performed on a financial-account before conducting a real-time financial activity of a customer may be provided to the Fraud Management System 180 for: (i) enriching the real-time financial activity by pulling data from the customer's profile; (ii) encoding each non-financial activity according to the dictionary of vector encodings by an activity encoder module; and (iii) creating an array of vectors ordered based on the provided chronical-sequence of the preconfigured number of non-financial activities performed on the financial-account.

According to some embodiments of the present disclosure, the fraud probability score may be used by a risk-case management system that is associated to the Fraud Management System 180 for devising a business rule that checks the fraud probability score against a fraud probability threshold value, through the ML sequence model and decides whether a financial activity should be alerted or passed without any further investigation.

According to some embodiments of the present disclosure, the risk-case management system may be a component in an ecosystem where the Fraud Management System resides, which allows a customer's strategy team to devise and deploy business rules that check different particulars or risk indications or corrective behavioral data in current real time transactions and suggest next course of action.

According to some embodiments of the present disclosure, the fraud probability score may be used to devise a business rule that can check against a particular fraud probability threshold value, the fraud probability score through the ML sequence model to decide whether a transaction should be alerted i.e., there is an event that requires an operation of a detection model, such as detection model 1410 in FIG. 14, or the transaction may pass without any further investigation.

According to some embodiments of the present disclosure, the converting to the executable, i.e., compiling may be implemented in a programming language. The programming language may be any selected programming language such as Java, Python, Scala or any other programming language. Python may be used for implementing the forward propagation routine, since the routine simplifies the ML sequence model execution to mere mathematical computations like matrix multiplications or additions.

FIG. 1B schematically illustrates a diagram of an integration of one or more embodiments of the current disclosure with a Fraud Management System 100B, in accordance with some embodiments of the present disclosure.

According to some embodiments of the present disclosure, in a system, such as Fraud Management System 100B, real-time activity data 101 may be passed over to asynchronous detection process 109 of a system, such as Fraud Management System 100. The real-time activity data 101 may include transactional or current activity information that identifies the type of interaction of the customer with the account, the device used for performing the activity, funds value requested for transfer if monetary transaction, etc.

According to some embodiments of the present disclosure, a model, such as validation rules model 102 performs a validation of incoming activity data to ensure fitness of different data elements and to ensure the presence of mandatory data elements in the activity to perform successful detection.

According to some embodiments of the present disclosure, a module, such as data fetch for data fetch for enrichments module 103 may retrieve profiled behavioral data of the customer and recent activities data to identify suspicious activities from a database, such as profiles DB 107.

According to some embodiments of the present disclosure, profiles DB 107 contains predefined expert features aggregation used for the execution of analytics for detection. The requirement of fraud detection in real time and hence computation of risk score within 200 milliseconds, implies a profile fetch in less than 5 ms and an optimum data used for detection analytics.

Hence, the requirement to define the preconfigured number of activities or lookback period to maintain only most relevant and recent data that can be easily fetched from profiles in real time and used for chronical-sequences of a preconfigured number of non-financial activities performed on a financial-account before conducting a financial activity, for detection.

According to one or more embodiments of the disclosure, the profiles DB 107 may be configured to maintain recent non-monetary activities sequence along with the chronological order for each customer. For example, last 2 days' non-monetary activities sequence for each customer in the financial institution on a moving time window. Also, the profile may be maintained to limit the maximum number of activities at a time up to a preconfigured number, e.g., 30.

According to some embodiments of the present disclosure, a real-time event, if non-monetary in nature, may be also profiled in the profiles DB 107 so that it may be used for formulating the chronical-sequences of a preconfigured number of non-financial activities for future activities of the customer that may be analyzed and detected for fraud by the Fraud Management System.

According to one or more embodiments of the disclosure, the profile maintenance may require verification of the type of a current activity performed in real-time and a classification of it as monetary or non-monetary.

According to one or more embodiments of the disclosure, an enrichment of current activity 104 may be an enrichment of the current real-time activity data 101 with the data fetched from profiles DB 107 and application DB 108, such as session-based enrichment, e.g., connection ISP etc. and customer-beneficiary relationship information. The data of the current real-time activity may be enriched, by a data fetch for enrichments module 103, with an array of vectors generated from an activity encoder module based on the dictionary of vector encodings, as shown in diagram 800 in FIG. 8. The array of vectors may be forwarded to enrichment of current activity 104 where the array of vector is attached or enriched to the real time transaction information.

Figure 10:
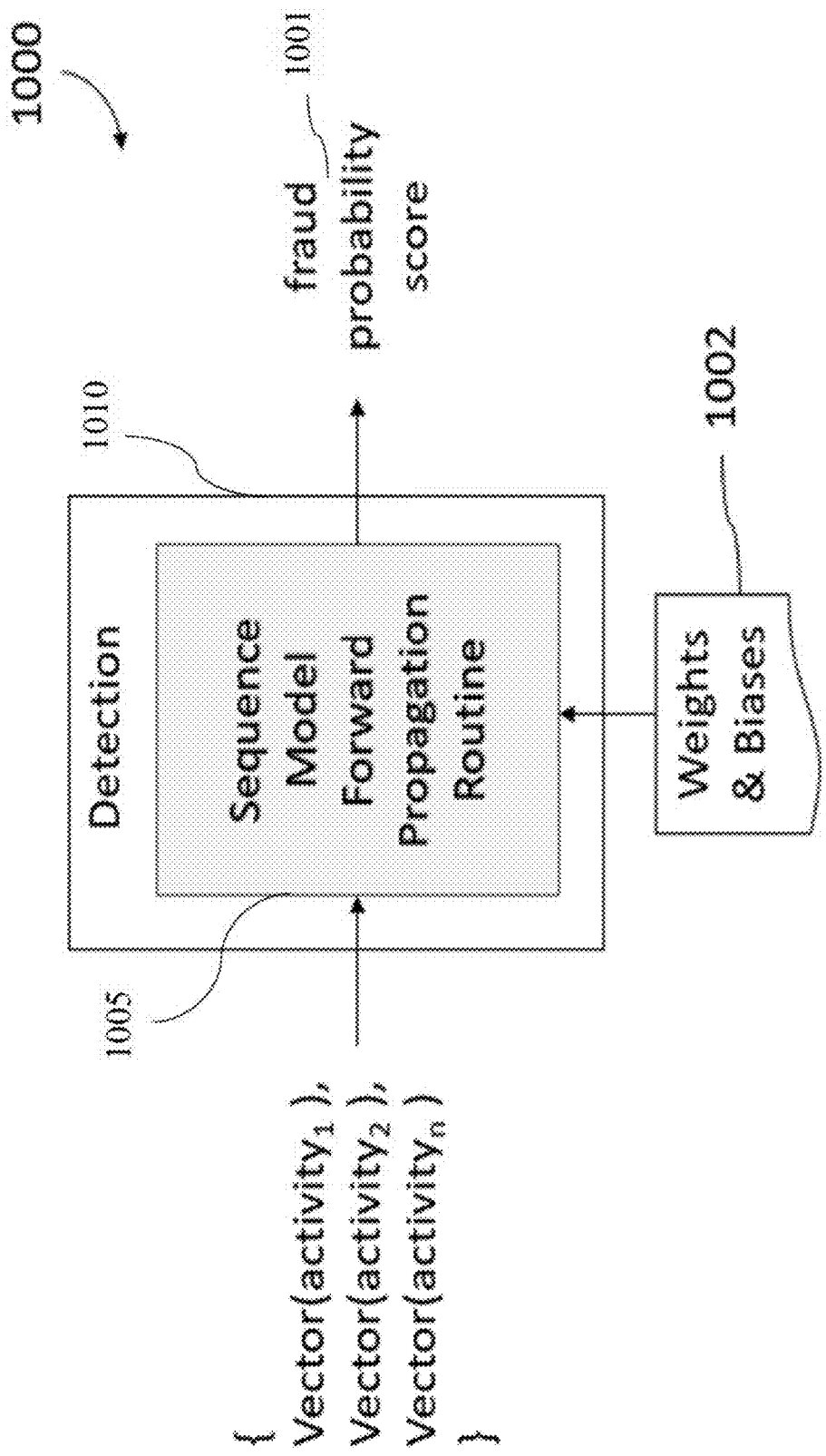
FIG. 10 is a diagrammatic representation of a forward propagation routine of an ML sequence model, for real-time prediction of probability of a non-financial activities sequence vector, in accordance with some embodiments of the present disclosure.

According to one or more embodiments of the disclosure, the array of vectors may be provided to ML models' execution 105, e.g., detection model, such as detection model 1010 in FIG. 10, and such as detection model 1410 in FIG. 14, for detection of fraud by predicting a probability score of a fraudulent financial-account access of a current real-time activity data 101 in FIG. 1B.

According to one or more embodiments of the disclosure, the profile DB 107 may be configured to maintain recent non-monetary activities sequence along with the chronological order thereof for each customer, as shown in FIG. 7. This profile maintenance which is an activity that runs in an asynchronous fashion during the detection process, e.g., integrated executable to predict fraudulent financial-account access by providing a fraud probability score to each chronical-sequence of a preconfigured number of non-financial activities, provided in real-time, requires a verification of the type of current activity performed in real-time and a classifying thereof as monetary or non-monetary.

According to one or more embodiments of the disclosure, an augmentation of the profiles DB 107 may be operated to enable profiling of customers' non-monetary activities sequence as a new profile item which may be used for predicting a probability of fraudulent financial-account access. The indication of the type of non-monetary activity may be used for profiling in this new profile item, as shown in activities sequence profile 700 in FIG. 7. The profiles DB 107 may be augmented to enable profiling of customers' non-monetary activities sequence as a new profile item e.g., a new table in profiles DB 107, which may be used for detection. The information of the type of non-monetary activity may be used for profiling or persistent in this new profile item.

According to one or more embodiments of the disclosure, in an asynchronous mode 110, the current real-time activity data 101 may be added to a database of queues 111 which is combined of one or more queues such as Application DB queue, profile queue, Investigation DataBase (IDB) queue, and Alert queue. A queue listener process 106 may dequeue data from each queue in the database of queues 111 and distribute data to the profiles DB 107, Application DB 108, IDB 112, and Alert database 113. The queue listener process 106 dequeues the item from the DB queues and updates the respective databases. The queue listener process 106 may be augmented to update the customer's activities sequence profile.

According to some embodiments of the present disclosure, for example, when a customer interacts with an account that is maintained with the FI and that interaction, e.g., events, has parameters that qualifies the interactions to be forwarded to a system, such as Fraud Management System 100B, such as Fraud Management System 180 in FIG. 1A and such as Fraud Management System 1400 in FIG. 14, for fraud detection. The 'Real-Time Activity Data' 101 represents the information related to this interaction of the customer. The data fetch for enrichments model 103 may pull data from the new profile that may be maintained in profiles DB 107 to store customer's activities sequence data.

According to some embodiments of the present disclosure, since the profile is maintained to drop older activities, only recent non-financial activities data, e.g., new profile, may be used to enrich the interaction data. e.g., current real time transaction with information of sequence of non-financial activities of the customer. The data fetch for enrichments model 103 may read the data from profiles DB 107 and may invoke a module, such as activity encoder module 802 in FIG. 8.

According to some embodiments of the present disclosure, the module, such as activity encoder module 802 in FIG. 802 may for example, convert the chronical-sequence of a preconfigured number of non-financial activities from text format or any other format to integer vectors by reading the corresponding vector representation of the activities in sequence from the dictionary of vector encodings which is stored in a storage, such as the persistent storage 170 that has been imported to the Fraud Management System 100B.

According to some embodiments of the present disclosure, the dictionary of vector encodings 135 may store a combination of activity type or name and a vector value. For example, when the activity type data may be in numeric format, like 'activity1' denoted as '5', 'activity2' as '9', etc., the data-vectorization model 125 may perform the encoding and embedding of each numeric activity data in the lab, i.e., during training of the model, and export the activity types and corresponding encodings to a persistent storage 170, e.g., a text file. In the persistent storage 170, the data would be for example, as follows, 5, [−0.32434] and 9, [0.976453], where '5' and '9' are the activity type as present in raw data and also as passed in same fashion to fraud management system in real time, and [−0.32434] and [0.976453] are their corresponding encodings respectively.

According to some embodiments of the present disclosure, the transformed activities sequence data may be forwarded to enrichments of current activity 104 which may populate a reserved variable object in memory that holds the chronical-sequence vector to be later on fed to the forward propagation routine which has been converted to an executable for integration with a Fraud Management System, to provide the fraud probability score and the forward propagation routine may read the persistent storage, such as persistent storage 170 in FIG. 1A, that contains the extracted weights, biases, e.g., exported in a persistent media, like a text file.

Figure 2:
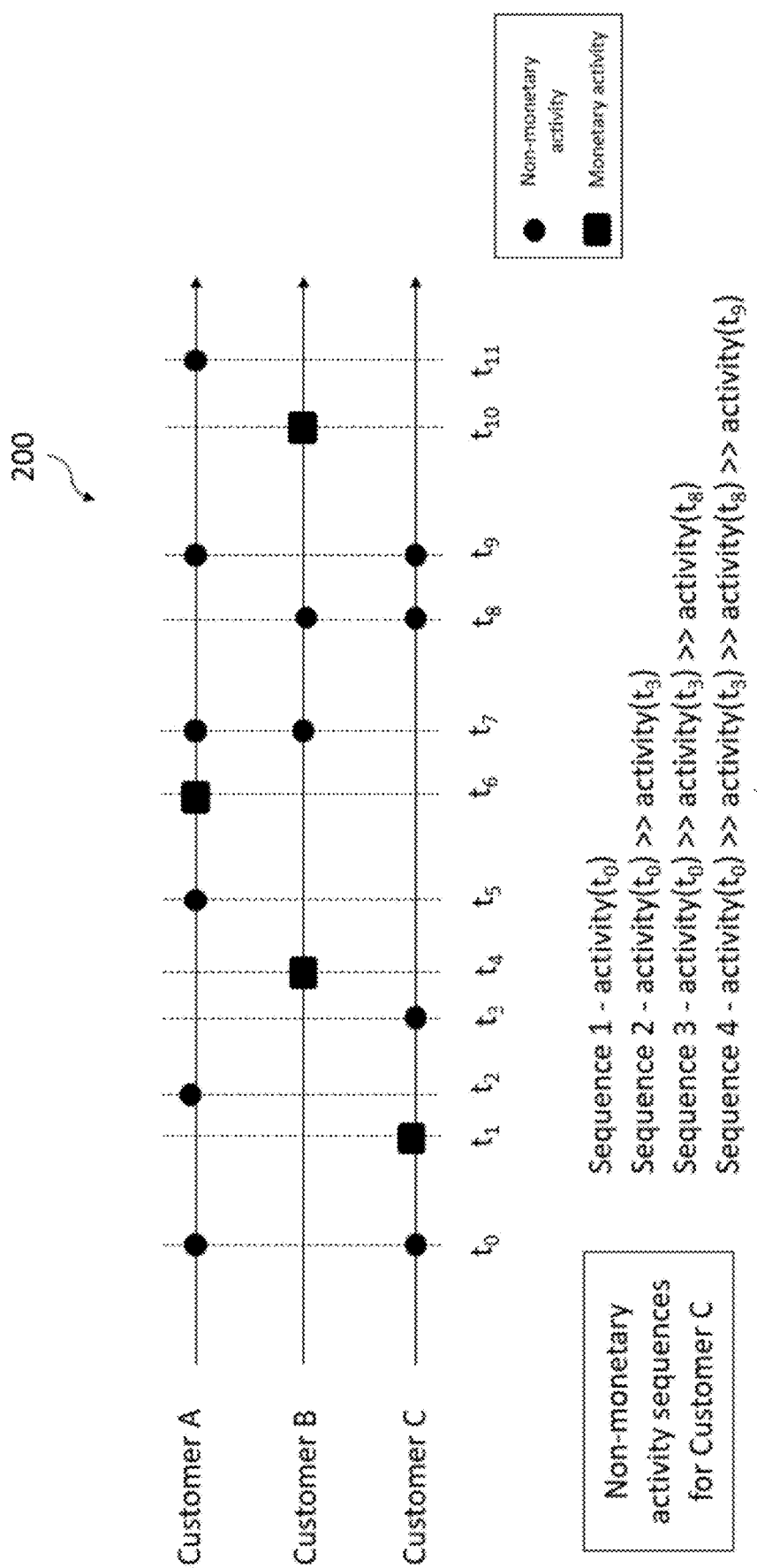
FIG. 2 is a diagrammatic representation of the monetary and non-monetary activities performed by the customers of a financial institution and the process of identification of non-monetary activities sequence, in accordance with some embodiments of the present disclosure.

FIG. 2 is a diagrammatic representation of the monetary and non-monetary activities 200 performed by the customers of a financial institution and the process of identification of non-monetary activities sequence, in accordance with some embodiments of the present disclosure.

According to one or more embodiments of the disclosure, activities 201 are non-monetary activities which have been performed by different customers of a financial institution over time. The type of activities or interactions with an account held at a financial institution can be broadly classified as monetary or non-monetary. Only the non-monetary activities 201 may be considered to identify illegitimate activities over the account to gain access by fraudsters and perform a monetary execution later.

According to one or more embodiments of the disclosure, non-monetary interactions with the account may be for example, in form of login using a mobile application or browser. PC, and laptop. In another example, it may be account service events such as ordering checkbook, unmasking an account number, or changing the password.

According to one or more embodiments of the disclosure, activity sequences 201 may be extracted for each customer by looking into the non-monetary activities performed by the party before any activity monetary or non-monetary. The activities in the sequence are unique and identified by their type.

FIG. 3 is a system diagram 300 of data vectorization model that performs the vectorization of activities sequence data, in accordance with some embodiments of the present disclosure.

According to one or more embodiments of the disclosure, labeled one or more chronical-sequences 305 may be provided to a data-vectorization model 310, such as data-vectorization 125 in FIG. 1A for training thereof.

According to one or more embodiments of the disclosure, the data-vectorization model 310 may be a Machine Learning (ML) model and may be used only in the lab. i.e., when building the ML sequence model to encode textual activities sequence data to an array of vectors. The data-vectorization model 310 is used to transform all training data before using it for training the ML sequence model.

According to one or more embodiments of the disclosure, the data-vectorization model 310 may be trained to (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value.

According to one or more embodiments of the disclosure, the data vectorization model 310 may include an encoder layer 301 that transforms each unique activity type in the provided sequence to a unique integer value. The data vectorization model 310 also include an embedding layer 302 that transforms the unique integer value into a unique vector 315, e.g., chronical-sequence vector, that corresponds to an activity type.

According to one or more embodiments of the disclosure, the embedding layer 302 may be for example Kera's Embedding Layer with input dimension parameter set to distinct activities type across all extracted sequences, output dimension value set to number of dimensions to be present for each activity vector, and input length parameter set to maximum size of the input activities sequence. This is required to ensure fixed-length output sequences when the data vectorization model 310 is used for transforming the data. The sequences which are shorter than the maximum size as configured may be embedded with zeros to have all the sequences in a fixed length.

According to one or more embodiments of the disclosure, a model, such as Machine learning (ML) sequence model for example, as shown in FIG. 5, may be trained to transform each input activities sequence, e.g., labeled one or more chronical-sequences 305 into arrays of vectors.

Figure 4:
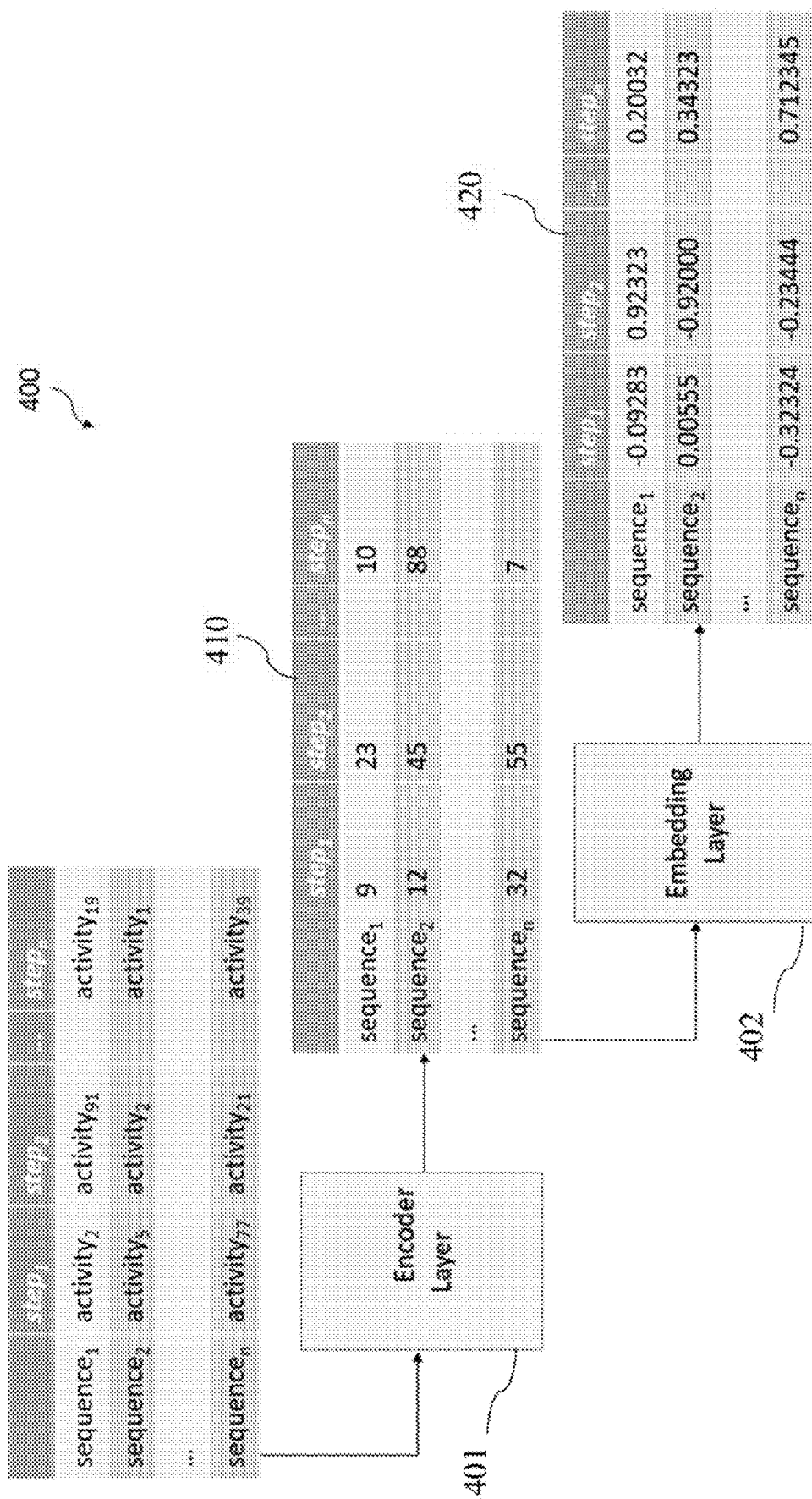
FIG. 4 is a stepwise transformation of input activities sequence data via encoder and embedding layer respectively of the data-vectorization module, in accordance with some embodiments of the present disclosure.

FIG. 4 is a stepwise transformation of input activities sequence data via encoder and embedding layer respectively 400 of the data vectorization module, in accordance with some embodiments of the present disclosure.

According to one or more embodiments of the disclosure, a trained data vectorization model, such as data-vectorization model 125 in FIG. 1A and such as data-vectorization model 310 in FIG. 3, may be used to convert all the activity sequences to arrays of vectors of fixed length. A dictionary of vector encodings that may be generated by the data-vectorization model may be exported to a persistent storage, such as persistent storage 170 in FIG. 1A.

According to one or more embodiments of the disclosure, each activities sequence vector represents events or steps in the chronological sequence, where each event is represented by a single dimension that is a non-monetary activity type. Each time-step may further be populated with the lag between events and/or other dimensions representing various risk indicators such as checking if a device that has been used for interacting with the account is trusted or unusual, whether the login geo-location is trusted or unusual or the Internet Service Provider (ISP) used for connecting with internet to perform the interaction.

According to one or more embodiments of the disclosure, the encoder layer 401, such as encoder layer 301 in FIG. 3 may transform each unique activity type in each provided sequence to a unique integer value, to yield an array of vectors 410 from the labeled one or more chronical-sequences. The array of vectors 410 may be provided to an embedding layer 402 to transform each unique integer value in the array of vectors into a unique vector and to yield an embedded array of vectors 420.

FIG. 5 is a system diagram of an ML sequence model 500 comprising four layers, in accordance with some embodiments of the present disclosure.

According to one or more embodiments of the disclosure, the four layers may be: (i) Long Short Term Memory (LSTM) 501; (ii) dense Rectified Linear Unit (ReLU) 502; (iii) dropout layer 503; and (iv) sigmoid layer 504.

According to one or more embodiments of the disclosure, each layer may perform different calculations on each chronical-sequence of a preconfigured number of non-financial activities that may be provided to the ML sequence model to generate a fraud probability score.

According to one or more embodiments of the disclosure, each layer of the ML sequence model in-turn may include multiple units called as cells. In the training process of the ML sequence model, the ML sequence model learns the pattern of the sequences, and thereby recomputes and reassigns weights and biases to each of these cells. When the training process is completed, the final weights and biases value assigned to each cell in each layer, is used in the fraud probability score calculation. The weights and biases from each cell of each layer of the ML sequence model, may be extracted and maintained in a persistent storage, and may be used by the forward propagation routine to transform the input vector sequence to generate the probability score.

According to one or more embodiments of the disclosure, in a non-limiting example, a supervised ML sequence model 500 having an LSTM layer 501 may include 64 cells may be trained to predict fraud in a chronical-sequence vector 510, based on a sampling. The sampling may be the array of vectors. The ML sequence model 500 may be trained on a single dimension event sequence, where each event is represented by a vector of activity type. The dimension here refers to a feature, e.g., non-financial activity type in text format. A single dimension event sequence thereby means a sequence containing occurrence of events where each event is represented by a non-financial activity.

According to one or more embodiments of the disclosure, the model may further include a rectified linear unit layer (ReLU) 502, a dropout layer 503, and a dense sigmoid layer 504 for generating a fraud probability score 520, as an output.

According to one or more embodiments of the disclosure, the trained ML sequence model 500 may include three trainable tensors called the kernel, recurrent kernel, and biases for the LSTM layer 501 in the ML sequence model 500. Each tensor, in turn, comprises of weights associated with the input gate, cell state, forget gate, and output gate of each LSTM cell. The weights from each layer for all four components of LSTM cells may be extracted from the LSTM layer 501 of the trained ML sequence model 500 and persisted in a text file.

According to one or more embodiments of the disclosure, the ReLU layer 502 of the trained ML sequence model 500 may include weights and biases associated with each cell which are extracted and persisted in a text file. A dense layer that implements a ReLU activation function may output maximum of 0 and the input argument, or the positive part of the argument. A dropout layer 503 may randomly ignore a set of neurons during the training process to prevent overfitting.

According to one or more embodiments of the disclosure, the sigmoid layer 504 of the trained ML sequence model 500 may include weights and bias associated with each cell which are extracted and persisted in a text file. A dense layer that implements the Sigmoid function may output the value bounded in the interval (0,1). The sigmoid layer 504 ensures obtaining a fraud probability score for an input activities sequence vector.

According to one or more embodiments of the disclosure, the ML sequence model 500 may be compiled with hyperparameters in which the loss function is defined as binary cross entropy which is suitable for a binary classification task. The ML sequence model 500 may be trained and validated for accuracy with varied number of epochs and the process may be completed when the log loss does not vary with the increase in the number of epochs.

Figure 6:
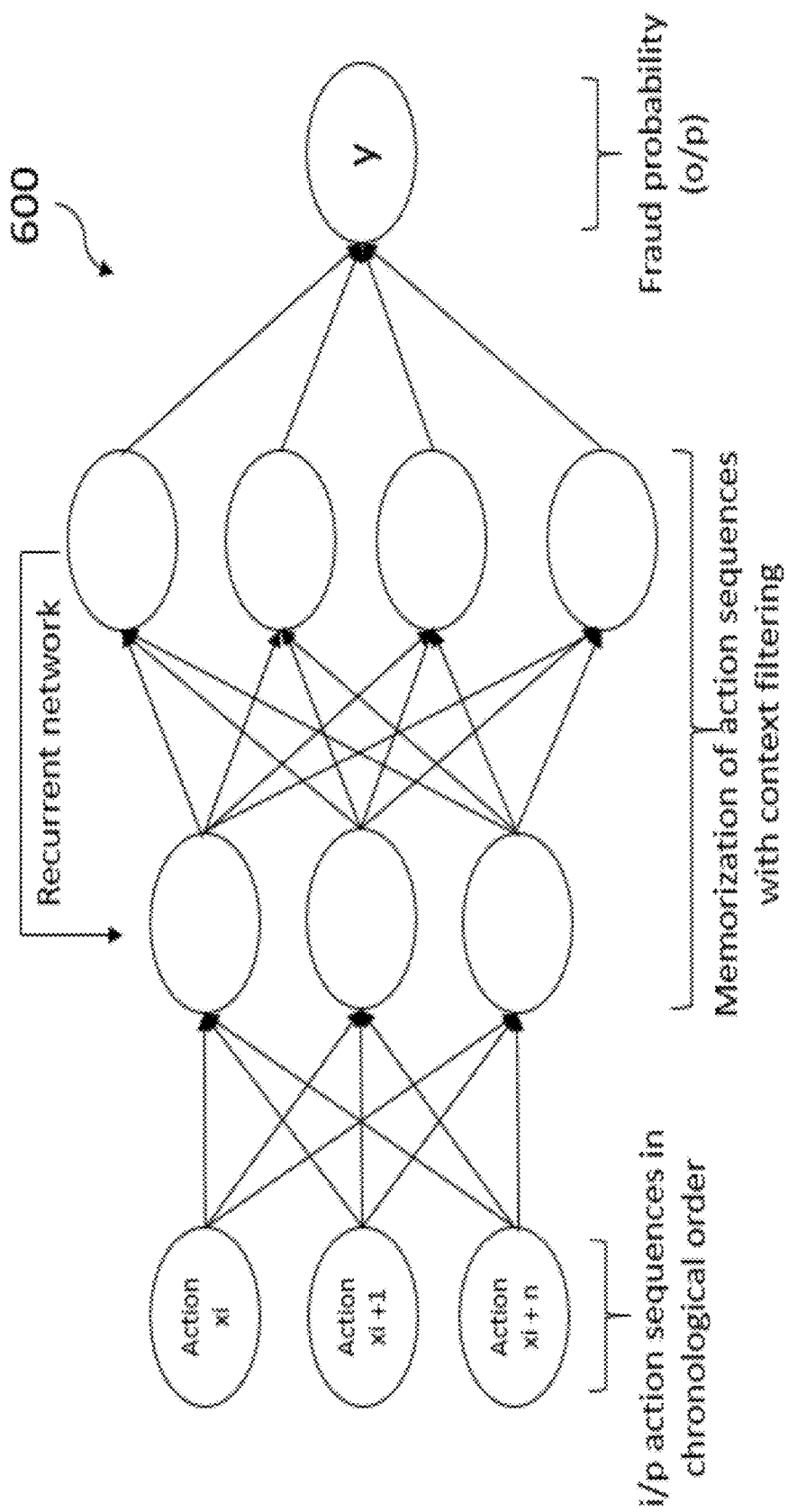
FIG. 6 is a high-level diagram of a recurrent network operating a recurrent feed-forward training process of a supervised LSTM model, in accordance with some embodiments of the present disclosure.

FIG. 6 is a high-level diagram of a recurrent network 600 operating a recurrent feed-forward training process of a supervised LSTM model, in accordance with some embodiments of the present disclosure.

According to one or more embodiments of the disclosure, a recurrent network, such as recurrent network that may operate a recurrent feed-forward training process 600 of a supervised LSTM model with labeled arrays of vectors as input. Each cell in an LSTM model consists of three parts and each processes input sequences event by event. An event represents an activity occurred at different timestamps in a chronological order. The first part of LSTM cell chooses whether information coming from previous timestamp is to be remembered or is irrelevant and can be forgotten. The second part learns new information from the input to this cell. And the third part passes the updated information from an event in current timestamp to an event in next timestamp. Each cell is presented with the new information from the input to the cell along with output from previous cell, hence recurrent. The output from the LSTM model is passed further to subsequent dense layers for generation of a fraud probability score, such fraud probability score 520 in FIG. 5.

FIG. 7 is a diagrammatic representation of the state of the customer's activities sequence profile 700 over time, in accordance with some embodiments of the present disclosure.

According to one or more embodiments of the disclosure, the state of the activities sequence profile 700 having a maximum length of the activities sequence may be configured to maintain maximum 2 days of activities data in the profile, i.e., 2 days lookback period and maximum 3 activities, i.e., maximum sequence length performed within these 2 days.

According to one or more embodiments of the disclosure, profile at time to contains 3 activities data along with the time of occurrences as permissible. The oldest activity may be performed for example, on Jan. 1, 2022, and the latter two activities on Jan. 2, 2022. At time $t_{n+1}$, there is a profiling of a new activity performed on Jan. 3, 2022, in the profile. Due to the constraint on the lookback period that has been defined on the profile, the system drops the activity performed on Jan. 1, 2022, from the profile to retain only the activities performed in the last 2 days. At time $t_{n+2}$, there is a profiling of a new activity performed on Jan. 4, 2022, and again to retain maximum last 2 days data in the profile, the system drops the activities performed on Jan. 2, 2022. At time $t_{n+3}$, there is a profiling of a new activity that is performed on Jan. 6, 2022, and since there is no activity in the last days, i.e., January $5^{th}$ through January 6th, and all the previous activities in the profile are older than last 2 days, the system may drop all the previous activities and may retain only the new activity performed on Jan. 6, 2022, in the profile.

Figure 8:
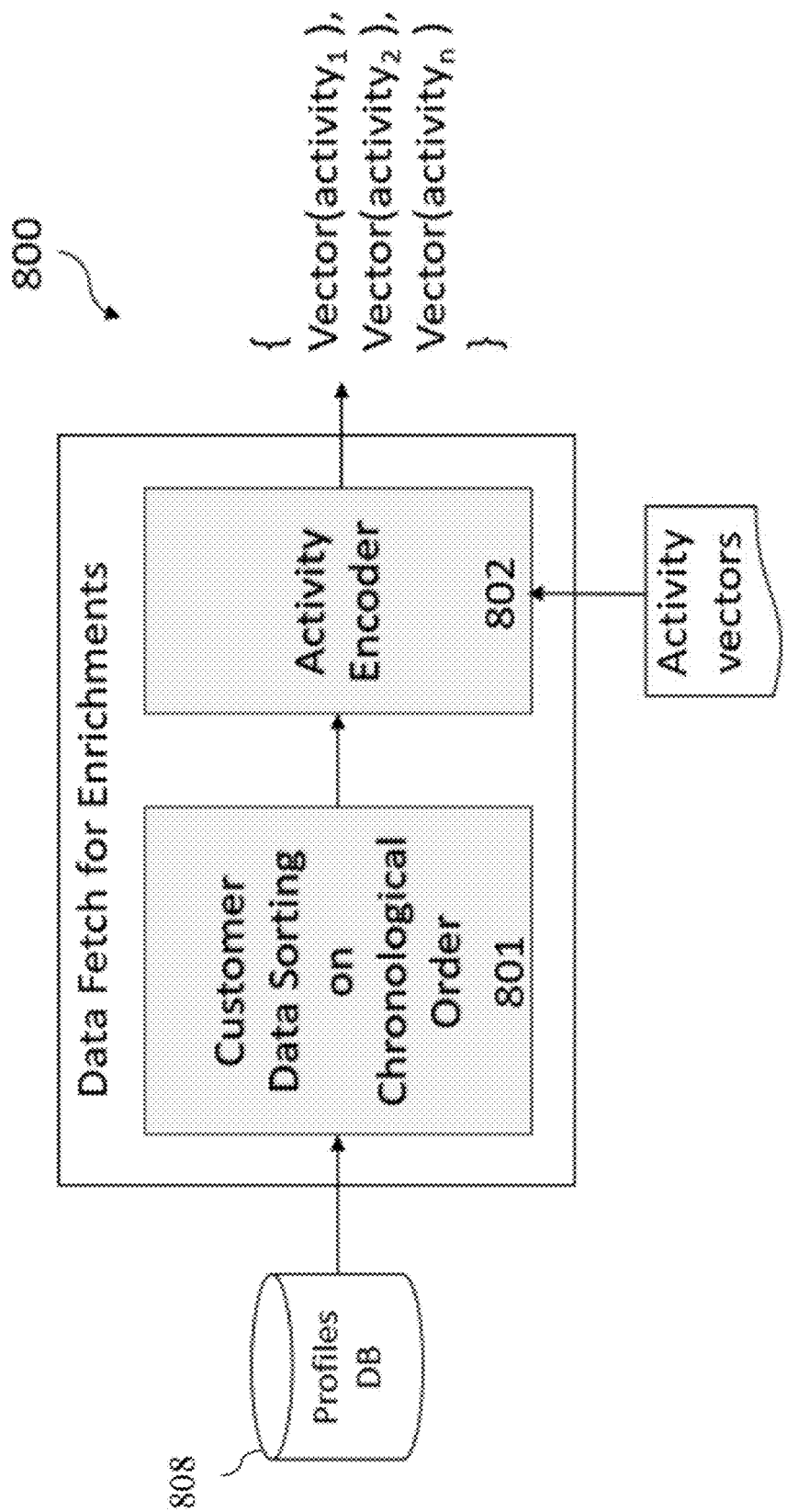
FIG. 8 is a diagrammatic representation of the augmentation of data fetch for enrichments phase of the Fraud Management System to enrich real-time activity with recent non-financial activities sequence vector, in accordance with some embodiments of the present disclosure.

FIG. 8 is a diagrammatic representation 800 of the augmentation of data fetch for enrichments phase of the Fraud Management System to enrich real-time activity with recent non-financial activities sequence vector, in accordance with some embodiments of the present disclosure.

According to one or more embodiments of the disclosure, customer data, e.g., chronical-sequence of a preconfigured number of non-financial activities, provided in real-time, may be fetched from a database such as profiles DB 808. The sequenced data may be sorted 801 in a chronological order, e.g., from oldest to newest. The sorted activities sequence data may be forwarded to an activity encoder module 802, such as activity encoder module 900 in FIG. 9, which may perform for example, a transformation of text-based activities sequence to an array of vectors. e.g., a chronical-sequence of a preconfigured number of non-financial activities sequence vector, as shown in FIG. 9.

FIG. 9 is a diagrammatic representation of an activity encoder module 900, in accordance with some embodiments of the present disclosure.

According to one or more embodiments of the disclosure, a module, such as the activity encoder module 900 may perform a vectorization of text-based activities sequence data or any other format. The activity encoder module 900 may include instructions for a transformation of each text-based activity in the sequence to a corresponding vector by performing a lookup from the activity vectors 901 dictionary which has been generated in the ML sequence model building phase.

According to one or more embodiments of the disclosure, an activity vectors 901 may be generated from each non-financial activity type and a compatible unique integer value, as shown in FIG. 8.

FIG. 10 is a diagrammatic representation of a forward propagation routine 1000 of an ML sequence model, for real-time prediction of probability of a non-financial activities sequence vector 1000, in accordance with some embodiments of the present disclosure.

According to one or more embodiments of the disclosure, implementing a forward propagation routine 1000 in an encapsulated environment that rums applications to mimic a process of the ML sequence model, e.g., detection model 1010. The forward propagation routine 1000 may mimic processing of a chronical-sequence of a preconfigured number of non-financial activities sequence vector, layer by layer to generate a fraud probability score 1001 and using weights and biases 1002 which were extracted from each layer of the trained ML sequence model. The encapsulated environment 130 may be implemented in any programming language and in a docker container or not.

According to one or more embodiments of the disclosure, in order to mimic the functioning of each layer of the ML sequence model, the forward propagation routine 1005 may leverage the weights and biases 1002 which have been computed by the trained ML sequence model. For this purpose, these weights and biases may be extracted from each layer of the trained ML sequence model and may be exported to the persistent storage, such as persistent storage 170 in FIG. 1A.

According to one or more embodiments of the disclosure, while implementing the forward propagation routine the weights and biases may be read from the persistent storage, such as persistent storage 170 in FIG. 1A, which are then used to transform the input matrix, i.e., chronical-sequence of a preconfigured number of non-financial activities sequence vector.

According to one or more embodiments of the disclosure, the risk score may be added to a currently enriched real-time activity and the activity data may be forwarded to a policy manager module for evaluation of strategy rules that decide on the alerting of the transaction and prescribed next steps based on the strategy rules which are evaluated as affirmative. The transaction risk score along with the indication of alert and prescribed next steps is wrapped in response and sent back to the source system from where the real-time activity information is passed for detection.

According to some embodiments of the present disclosure, the accuracy of the sequence model may deplete over time and would require re-tuning of the model. The methods for the development of a sequence model may be used for re-tuning the ML sequence model. The activities vector 901 in FIG. 9, may be revised in the process. The weights and biases 1002 from the re-tuned sequence model's layers are revised in the process. The updated artifacts of the re-tuned model may replace the artifacts of the old model in production to upgrade the new challenger model to champion.

According to some embodiments of the present disclosure, when a new or first ML sequence model, such as ML sequence model 500 in FIG. 5, may be imported to production, a dictionary of activity encodings, weights and biases from the trained sequence model's layers and forward propagation routine logic may be also imported in an executable format. The forward propagation routine logic becomes part of the Fraud Management System code. The forward propagation routine may be implemented such that a retuned ML sequence model should not alter its functioning. That is, the forward propagation routine that has been implemented which mimics the ML sequence model, does not correspond to any specific trained ML sequence model, rather corresponds to functioning of any ML sequence model in general.

According to some embodiments of the present disclosure, the same executable that runs with the weights and biases from old ML sequence model may continue to run with the weights and biases from the new retuned ML sequence model. The weights and biases storage path may be provided as configuration to the forward propagation routine and hence, replacing the old ML sequence model in production just requires replacing the weights and biases of old ML sequence model from this storage path with the weights and biases of the new ML model.

Figure 11:
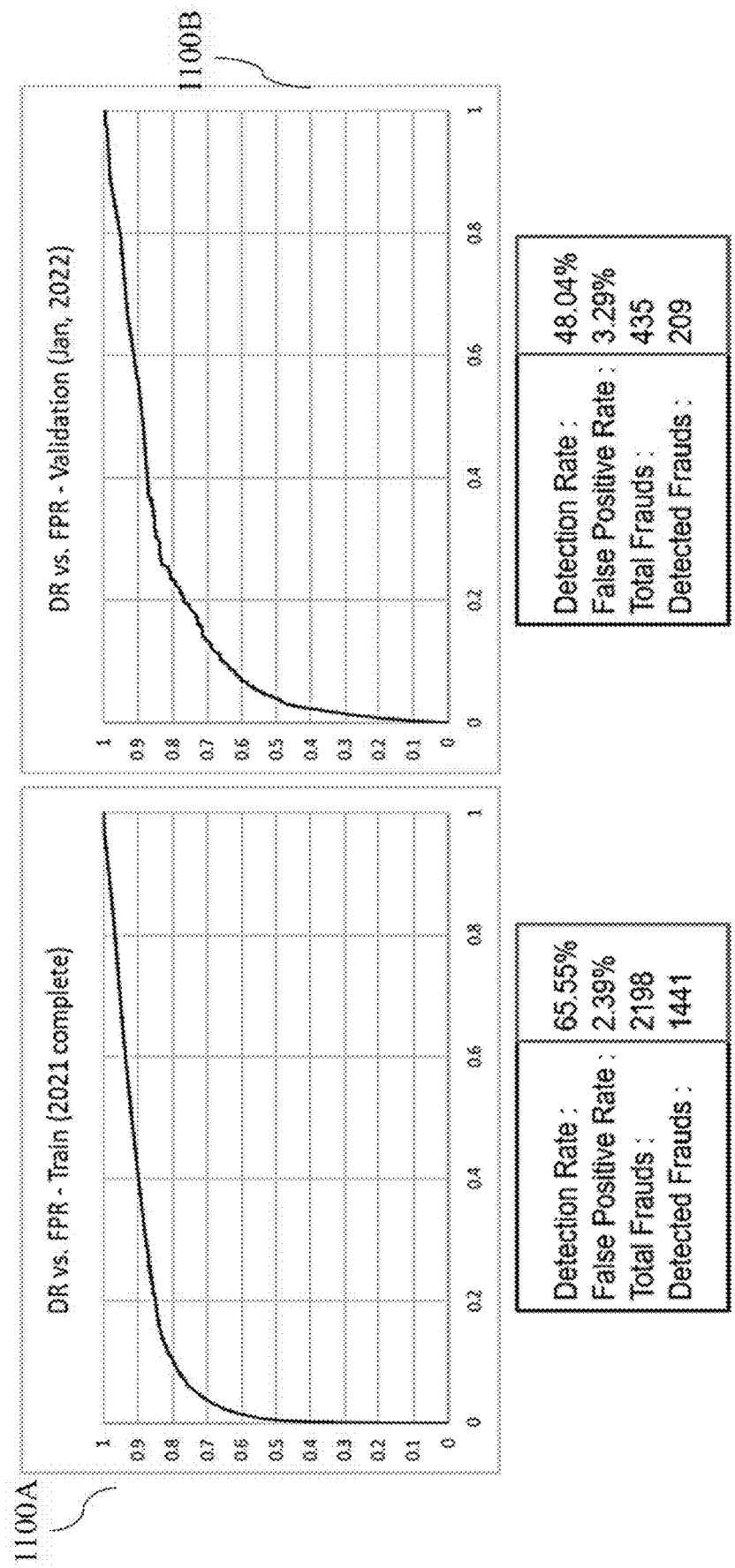
FIG. 11 is a graphical representation of a fraud detection performance of an ML sequence model with a varied alert rate of the ML sequence model on training and validation data, in accordance with some embodiments of the present disclosure.

FIG. 11 is a graphical representation of a fraud detection performance of an ML sequence model with a varied alert rate of the ML sequence model on training and validation data, in accordance with some embodiments of the present disclosure.

According to some embodiments of the present disclosure, an incremental value of an ML sequence model, such as ML sequence model 500 in FIG. 5, over a state-of-the-art model in production that performs prediction using transactional features or predefined aggregated data elements.

According to some embodiments of the present disclosure, graph 1100A shows the performance of the ML sequence model, such as ML sequence model 500 in FIG. 5 or LSTM layer thereof on an input activities sequence data over the training data that spans over the whole year of 2021.

According to some embodiments of the present disclosure, graph 1100A is a receiver operating characteristic curve or Receiver operating characteristic (ROC) curve that illustrates the diagnostic ability i.e., fraud detection rate, of a binary classifier system, as its discrimination threshold, i.e., false positive rate, is varied. The x-axis and y-axis represent the false positive rate and true positive rate, i.e., detection rate respectively. The curve in graph 1100A shows the trade-off between the sensitivity of the model to rightly classify the fraudulent event as fraudulent, and the specificity to rightly classify a non-fraudulent event as non-fraudulent. Classifiers that give curves closer to top-left corner indicates a better performance.

According to some embodiments of the present disclosure, graph 1100A shows that by just varying the false positive rate to 2.39%, the detection model, such as detection model 1410 in FIG. 14, is able to provide a detection rate of 65.5%. In other words, the detection model is able to detect 65.5% frauds in the system at a cost of 2.39% clean transactions which are misclassified by the detection model as fraudulent. Therefore, the performance of the detection model as depicted in graph 1100A is acceptable for deployment in production system.

According to some embodiments of the present disclosure, graph 1100B shows the performance of the ML sequence model, such as ML sequence model 500 in FIG. 5 or LSTM layer thereof on an input activities sequence data over the training data that spans over January month of 2022.

According to some embodiments of the present disclosure, the graphs 1100A and 1100B represent the rate of increase in the detection of frauds (DR) with an increase in the rate of detected clean activities, also referred to as False Positives Ratio (FPR). The metrices in the graphs 1100A and 1100B have been calculated based on cut-off score e.g., fraud probability score, that has been achieved through the sequence model that offers significant True Positive Rate e.g., Detection rate of 65.5% and 48.04%, at a False Positive Rate of 2.39% and 3.29% in training and validation set respectively.

According to some embodiments of the present disclosure, graph 1100B show a 48% detection rate, which means an identification of 48% fraudulent cases at the access stage and enabling FIs to block the subsequent monetary attempt if performed by the fraudster. This detection comes at the cost of mere 3.29% of false positives or cleans mis-classified as fraud by the detection model, which is insignificant population and can be further reduced by devising strategy rules that looks for other corrective behavior in the current activity by the account holder such as usage of a trusted device and usual ISP connection, to reduce the risk and inhibiting an alert generation.

Figure 12:
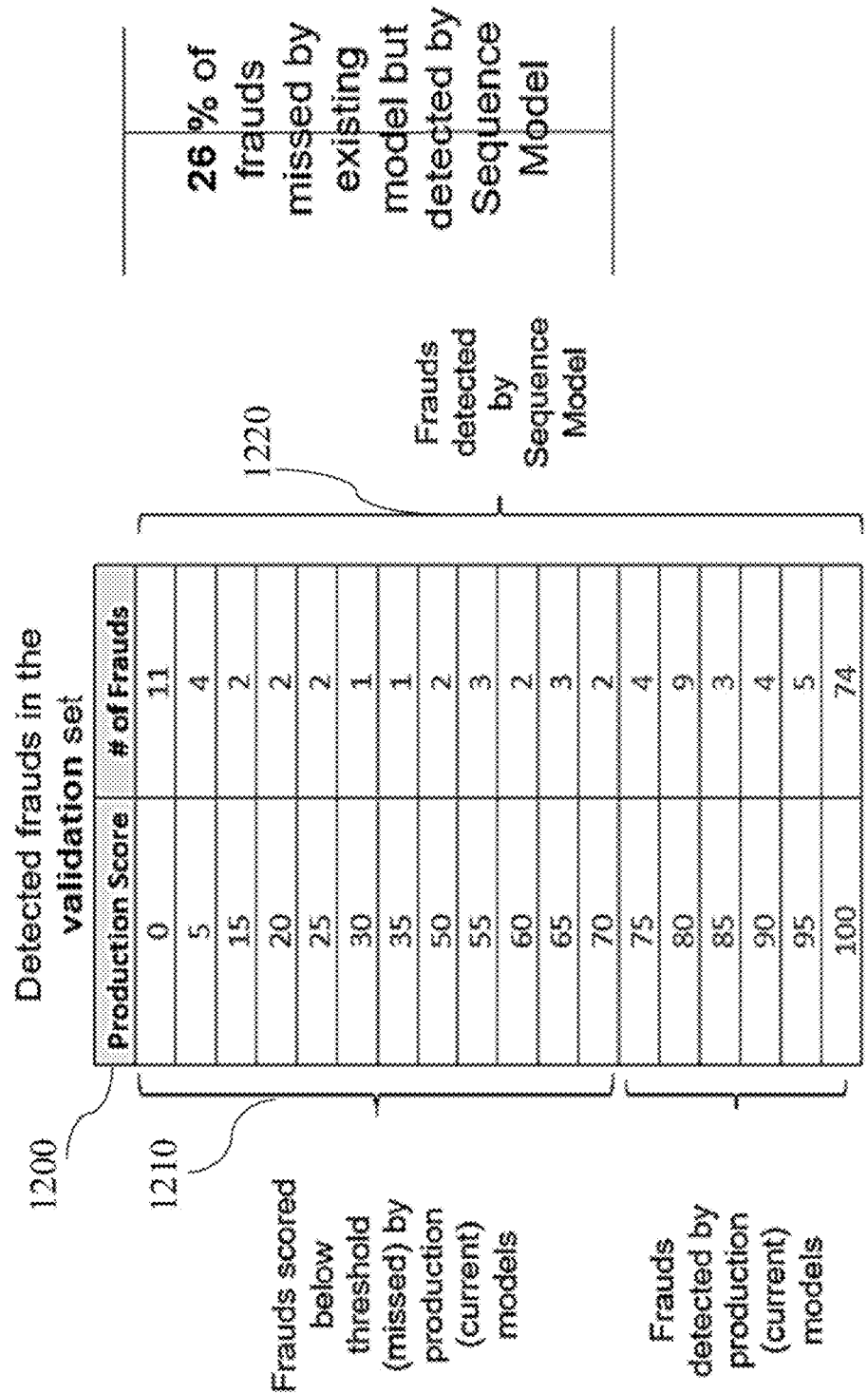
FIG. 12 is a tabular representation of incremental fraud detection provided by ML sequence model when used in parallel with the state-of-the-art model in production, in accordance with some embodiments of the present disclosure.

FIG. 12 is a tabular representation 1200 of incremental fraud detection provided by an ML sequence model when used in parallel with the state-of-the-art model in production, in accordance with some embodiments of the present disclosure.

According to some embodiments of the present disclosure, the ML sequence model, such as ML sequence model 500 in FIG. 5, provides an early detection of 26% of frauds missed by the state-of-the-art models before fraudster attempted monetary execution.

According to some embodiments of the present disclosure, the tabular representation 1200 of incremental fraud detection provided by the sequence model when used in parallel with the state-of-the-art model in production, shows fraudulent transactions that are detected by the ML sequence model, such as ML sequence model 500 in FIG. 5, e.g., got a fraud probability score above a fraud probability threshold value along with the score for these fraudulent transactions generated by existing state-of-the-art models in production environment.

According to some embodiments of the present disclosure, assuming that the alerting fraud probability threshold value is set to 75 in production environment, the tabular representation 1200 shows that a significant number of frauds that were scored lower 1210 than the fraud probability threshold value of 75. The frauds missed by production model 1210 but detected by the ML sequence model, such as ML sequence model 500 in FIG. 5, account for 33% of total frauds detected of 209 by the ML sequence model 1220.

FIG. 13 is an example of a list of non-monetary activities in an activities sequence mined at the occurrence of each activity by each customer, in accordance with some embodiments of the present disclosure.

According to some embodiments of the present disclosure, the non-monetary activities may be for example, online banking initiated, account number unmasked, customer information update, password reset request, new account apply, change phone number, change address, add additional user, change e-mail address, card activation, Remote Deposit Capture (RDC) item add success, debit card locked by user, debit card unlocked by user, mobile unroll, and credit card lost.

According to some embodiments of the present disclosure, the list in the example may be truncated to retain activities performed within e.g., last two days of the current activity performed by the customer. The retained activities may be a chronical-sequence of a preconfigured number of non-financial activities performed on each financial-account before conducting a financial activity during a latter preconfigured period. The lookback period e.g., last two days may be configured to accurately identify the burst in illegitimate access activities performed by the fraudsters over the victim's account based on subject matter expertise and analysis of the reported fraudulent transactions.

FIG. 14 is a high-level process flow diagram of a Fraud Management System 1400, in accordance with some embodiments of the present disclosure.

According to some embodiments of the present disclosure, a system, such as Fraud Management System 1400 includes incoming financial transactions into a data integration component which is operating an initial preprocess of the data. Transaction enrichments is the process where preprocess of the transactions happen. The process of getting historical data synchronizes with new incoming transactions. It is followed by a detection model 1410, such as ML sequence model 500 in FIG. 5, which is activated when the system 1400 receives an event to detect the incoming transaction from the customer, after which, a transaction gets its a probability of fraudulent financial-account access by providing a fraud probability score to each chronical-sequence of a preconfigured number of non-financial activities, provided in real-time.

According to some embodiments of the present disclosure, a policy calculation treats the transactions having a high-risk score i.e., suspicious scores, e.g., when the fraud probability score is above a predefined threshold, and routes it accordingly. The Fraud Management System 1400 may not allow a user to proceed to conduct a financial activity in the customer account.

According to some embodiments of the present disclosure, profiles database 1407, such as profiles DB 107 in FIG. 1B, contain aggregated financial transactions according to time period. The profile updates synchronize according to new created or incoming transactions Risk Case Management system (RCM) 1414 is a system where risk score management is operated: investigation, monitoring, sending alerts, or marking as no risk.

According to some embodiments of the current disclosure. Investigation DataBase (IDB) system, such as IDB 112 in FIG. 1B, is used when research transactional data and policy rules resulting for investigation purposes. It analyzes historical cases and alert data.

According to some embodiments of the current disclosure, analysts can define calculated variables using a comprehensive context, such as the current transaction, the history of the main entity associated with the transaction, the built-in models result etc. These variables can be used to create new indicative features. The variables can be exported to the detection log, stored in IDB 1412 and exposed to users in user analytics contexts.

According to some embodiments of the current disclosure, financial transactions that satisfy certain criteria may indicate occurrence of events that may be interesting for the analyst. The analyst can define events the system identifies and profiles when processing the transaction that may trigger the activation of detection model 1410, such as ML sequence model 500 in FIG. 5. This data can be used to create complementary indicative features (using the custom indicative features mechanism or SMO). For example, the analyst can define an event that says: amount >$100,000.

FIGS. 15A-15B are a high-level workflow of an operation of building a Machine Leaning (ML) sequence model 1500, in accordance with some embodiments of the present disclosure.

According to some embodiments of the present disclosure, operation 1510 comprising retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database.

According to some embodiments of the present disclosure, operation 1520 comprising labeling each one or more chronical-sequences as fraud or non-fraud, based on the label of fraud or non-fraud which is associated to each compatible financial-activity that the chronical-sequence has preceded.

According to some embodiments of the present disclosure, operation 1530 comprising providing the labeled one or more chronical-sequences to a data-vectorization model to: (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value.

According to some embodiments of the present disclosure, operation 1540 comprising exporting the dictionary of vector encodings to a persistent storage, such as persistent storage 170 in FIG. 1A.

According to some embodiments of the present disclosure, operation 1550 comprising training the ML sequence model to predict fraud in a chronical-sequence vector, based on a sampling, wherein the sampling is the array of vectors.

Figure 16:
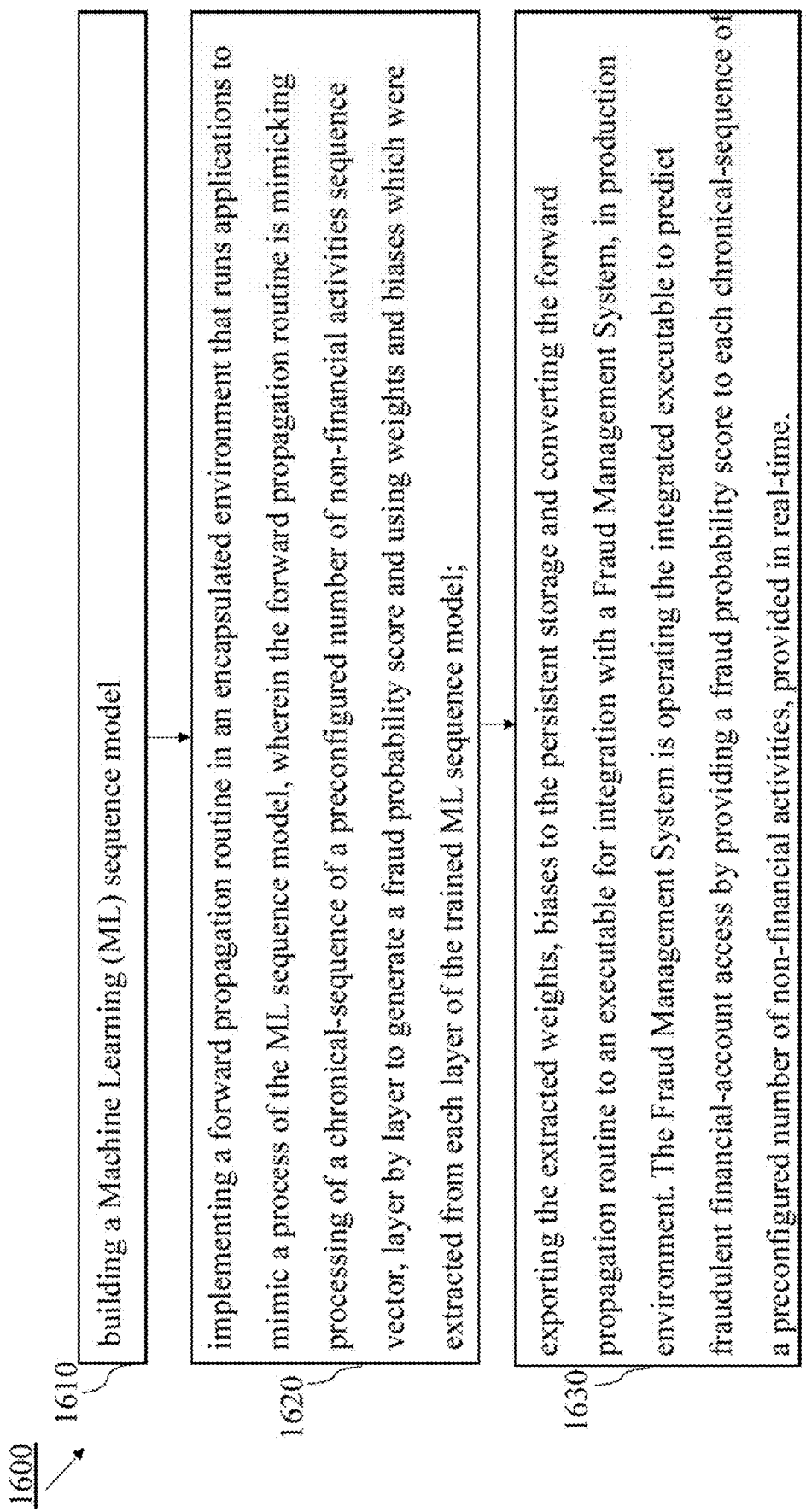
FIG. 16 is a high-level workflow of a computerized-method for predicting a probability of fraudulent financial-account access, in accordance with some embodiments of the present disclosure.

FIG. 16 is a high-level workflow 1600 of a computerized-method for predicting a probability of fraudulent financial-account access, in accordance with some embodiments of the present disclosure.

According to some embodiments of the present disclosure, operation 1610 comprising building a Machine Learning (ML) sequence model. The ML sequence model may be such as ML sequence model 500 in FIG. 5. Operation 1610 may be for example, such as operation of building a ML sequence model 1500 in FIGS. 15A-15B.

According to some embodiments of the present disclosure, operation 1620 comprising implementing a forward propagation routine in an encapsulated environment that runs applications to mimic a process of the ML sequence model, wherein the forward propagation routine is mimicking processing of a chronical-sequence of a preconfigured number of non-financial activities sequence vector, layer by layer to generate a fraud probability score and using weights and biases which were extracted from each layer of the trained ML sequence model.

According to some embodiments of the present disclosure, operation 1630 comprising exporting the extracted weights, biases to a persistent storage, such as persistent storage 170 in FIG. 1A and converting the forward propagation routine to an executable for integration with a Fraud Management System, in production environment. The Fraud Management System, such as Fraud Management System 180 in FIG. 1A may operate the integrated executable, such as integrated executable 190 in FIG. 1A, to predict fraudulent financial-account access by providing a fraud probability score to each chronical-sequence of a preconfigured number of non-financial activities, provided in real-time. The Fraud Management System may be for example such as system 100 in FIG. 1B and system 1400 in FIG. 14.

FIGS. 17A-17B are a high-level workflow of a forward propagation routine, in accordance with some embodiments of the present disclosure.

FIG. 17A shows the extracted weights and biases from each layer of the ML sequence model, e.g., (i) Long Short Term Memory (LSTM); (ii) dense Rectified Linear Unit (ReLU); (iii) dropout; and (iv) dense sigmoid, used to evaluate the forward propagation routine. whereby:

prev_cell_op is previous LSTM cell output;
prev_cell_hs is previous LSTM cell hidden state;
w_ip is input gate weights from LSTM kernel weights;
w_cs is cell state weights from LSTM kernel weights;
w_f is forget gate weights from LSTM kernel weights;
w_o is output gate weights from LSTM kernel weights;
u_ip is input gate weights of LSTM recurrent kernel weights;
u_cs is cell state weights from LSTM recurrent kernel weights;
u_f is forget gate weights from LSTM recurrent kernel weights;
u_o is output gate weights from LSTM recurrent kernel weights;
b_ip is input gate biases from LSTM biases;
b_cs is cell state biases from LSTM biases;
b_f is forget gate biases from LSTM biases;
b_o is otput gate biases from LSTM biases;
w_relu is weights associated with ReLu layer;
b_relu is biases associated with ReLu layer;
w_sigmoid is weights associated with sigmoid layer; and
b_sigmoid is biases associated with sigmoid layer.

Sigmoid is a mathematical function having characteristic "S"-shaped curve. Used as a gating function in the LSTM layer and to bound the output of the ML sequence model in the interval (0.1). Relu is rectified Linear Unit which is an activation function used to define the positive part of its argument. Tanh is a hyperbolic tangent function, which is the hyperbolic analogue of the Tan circular function. In LSTM tanh is used to determine candidate cell state values and update the hidden state. The dropout layer is not trainable and hence excluded from the forward propagation routine workflow.

FIG. 17B shows three weight matrices of a trained LSTM, in accordance with some embodiments of the present disclosure.

According to some embodiments of the present disclosure, the trained LSTM layer has 3 weight matrices which are (i) kernel i.e., input weights; (ii) recurrent kernel i.e., hidden state weights; and (iii) biases. Each weight matrices contains weights for four LSTM units, which are input, forget gate, cell state, and output, in the respective order.

According to some embodiments of the present disclosure, below equations show the structure of the matrices for the stated LSTM units across all three weight matrices:

$w\_ip = (W_{ij})_{i \in k,\ 1 \leq j \leq r}$
$w\_f = (W_{ij})_{i \in k,\ r \leq j \leq 2r}$
$w\_c = (W_{ij})_{i \in k,\ 2r \leq j \leq 3r}$
$w\_o = (W_{ij})_{i \in k,\ 3r \leq j}$ where, $W_{k,4r}$ is LSTM kernel weights matrix, k is 1 and r is the number of LSTM cells.

$u\_ip = (U_{ij})_{i \in k,\ 1 \leq j \leq r}$
$u\_f = (U_{ij})_{i \in k,\ r \leq j \leq 2r}$
$u\_c = (U_{ij})_{i \in k,\ 2r \leq j \leq 3r}$
$u\_o = (U_{ij})_{i \in k,\ 3r \leq j}$ where, $U_{k,4r}$ is LSTM recurrent kernel weights matrix, k and r are the number of LSTM cells.

$b\_ip = (B_j)_{1 \leq j \leq r}$
$b\_f = (B_j)_{r \leq j \leq 2r}$
$b\_c = (B_j)_{2r \leq j \leq 3r}$
$b\_o = (B_j)_{3r \leq j}$ where, $B_{4R}$ is LSTM biases matrix, r is the number of LSTM cells.

According to some embodiments of the present disclosure, the weights for each LSTM unit is extracted by slicing the above three weight matrices from the trained LSTM layer.

According to some embodiments of the present disclosure, the trained ReLu layer has two weight matrices: (i) input weights; and (ii) biases.

According to some embodiments of the present disclosure, below equations show the structure of each in respective order:

$w\_relu = (W_{r,r})$, where r is the number of cells in dense ReLu layer.
$b\_relu = (B_{r,l})$, where r is the number of cells in dense ReLu layer.

According to some embodiments of the present disclosure, the weights from trained ReLU layer may be extracted according to the above.

According to some embodiments of the present disclosure, the trained Sigmoid layer has two weight matrices: (i) input weights; and (ii) biases. Below equations show the structure of each in respective order:

w_sigmoid=$(W_{r,1})$, where r is the size of dense ReLu layer output b_sigmoid=$(B_{1,1})$ The weights from a trained Sigmoid layer may be extracted according to the above.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for predicting a probability of fraudulent financial-account access, said computerized-method comprising:
   a. building a Machine Learning (ML) sequence model by:
      (i) retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database;
      (ii) labeling each one or more chronical-sequences as fraud or non-fraud, based on the label of fraud or non-fraud which is associated to each compatible financial-activity that the chronical-sequence has preceded;
      (iii) providing the labeled one or more chronical-sequences to a data-vectorization model to: (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value;
      (iv) exporting the dictionary of vector encodings to a persistent storage; and
      (v) training the ML sequence model to predict fraud in a chronical-sequence vector, based on a sampling, wherein the sampling is the array of vectors;
   b. implementing a forward propagation routine in an encapsulated environment that runs applications to mimic a process of the ML sequence model, wherein the forward propagation routine is mimicking processing of a chronical-sequence of a preconfigured number of non-financial activities sequence vector, layer by layer to generate a fraud probability score and using weights and biases which were extracted from each layer of the trained ML sequence model; and
   c. exporting the extracted weights, biases to the persistent storage and converting the forward propagation routine to an executable for integration with a Fraud Management System, in a production environment,
      wherein the Fraud Management System is operating the integrated executable to predict a probability of fraudulent financial-account access by providing a fraud probability score to each chronical-sequence of a preconfigured number of non-financial activities, provided in real-time.

2. The computerized-method of claim 1, wherein the preconfigured number of non-financial activities of the chronical-sequence is determined by a Subject Matter Expert (SME) to maintain maximum number of fraudulent activities to access a financial-account by a fraudster or activities operated by a mule.

3. The computerized-method of claim 1, wherein the ML sequence model comprising of four layers: (i) Long Short Term Memory (LSTM); (ii) dense Rectified Linear Unit (ReLU); (iii) dropout; and (iv) dense sigmoid, and wherein weights and biases of each layer are extracted and stored in the persistent storage.

4. The computerized-method of claim 1, wherein sampling for the training of the ML sequence model is related to a number of vectors of the one or more chronical-sequences in the persistent storage and to the latter preconfigured period, wherein the number of vectors of the one or more chronical-sequences is a distinct number of financial activity types.

5. The computerized-method of claim 1, wherein the ML sequence model is a ML model that is suitable for sequential data.

6. The computerized-method of claim 1, wherein the computerized-method further comprising profiling for each customer the retrieved one or more chronical-sequences of the preconfigured number of non-financial activities performed for each financial-account before conducting a financial activity during a latter preconfigured period to limit the preconfigured number of non-financial activities.

7. The computerized-method of claim 6, wherein the computerized-method is further comprising augmenting the Fraud Management System for early fraud detection using the trained ML sequence model.

8. The computerized-method of claim 6, wherein a recent chronical-sequence of a preconfigured number of non-financial activities performed on a financial-account before conducting a real-time financial activity of a customer is provided to the Fraud Management System for: (i) enriching the real-time financial activity by pulling data from the customer's profile; (ii) encoding each non-financial activity according to the dictionary of vector encodings by an activity encoder module; and (iii) creating an array of vectors ordered based on the provided chronical-sequence of the preconfigured number of non-financial activities performed on the financial-account.

9. The computerized-method of claim 1, wherein the fraud probability score is used by a risk-case management system that is associated to the Fraud Management System for devising a business rule that checks the fraud probability score against a fraud probability threshold value, through the ML sequence model and decides whether a financial activity should be alerted or passed without any further investigation.

10. The computerized-method of claim 3, wherein weights and biases of a re-tuned ML sequence model replace weights and biases of the ML sequence model that is running in production environment to improve accuracy of the ML sequence model that is operating in the Fraud Management System in production environment.

11. The computerized-method of claim 1, wherein when the fraud probability score is above a predefined threshold, the Fraud Management System does not allow a user to proceed to conduct a financial activity in the customer account.

12. The computerized-method of claim 1, wherein the process of the ML sequence model is in a form of mathematical equations that operate on the chronical-sequence of a preconfigured number of non-financial activities sequence vector to generate a probability score.

13. The computerized-method of claim 1, wherein the converting to the executable is implemented in a programming language.

14. A computerized-system for predicting a probability of fraudulent financial-account access, said computerized-system comprising:
  a memory to store a customers-account database and a persistent storage; and one or more processors, said one or more processors are configured to:
  a. build a Machine Learning (ML) sequence model by:
    (i) retrieving one or more chronical-sequences of a preconfigured number of non-financial activities performed on each financial-account before conducting a financial activity during a latter preconfigured period and a label of fraud or non-fraud which is associated to each compatible financial-activity, from a customers-account database;
    (ii) labeling each one or more chronical-sequences as fraud or non-fraud, based on the label of fraud or non-fraud which is associated to each compatible financial-activity that the chronical-sequence has preceded;
    (iii) providing the labeled one or more chronical-sequences to a data-vectorization model to: (a) encode each non-financial activity in each chronical-sequence into a unique integer value and each chronical-sequence of the one or more chronical-sequences as a vector, thus yielding an array of vectors from the labeled one or more chronical-sequences; and (b) generate a dictionary of vector encodings from each non-financial activity type and compatible unique integer value;
    (iv) exporting the dictionary of vector encodings to the persistent storage; and
    (v) training the ML sequence model to predict fraud in a chronical-sequence vector, based on a sampling, wherein the sampling is the array of vectors;
  b. implement a forward propagation routine in an encapsulated environment that runs applications to mimic a process of the ML sequence model, wherein the forward propagation routine is mimicking a process of a chronical-sequence of a preconfigured number of non-financial activities sequence vector, layer by layer to generate a fraud probability score and extracting weights and biases from each layer of the trained ML sequence model; and
  c. extract the extracted weights, biases and convert the forward propagation routine to an executable for integration with a Fraud Management System, in a production environment,
    wherein the Fraud Management System is operating the integrated executable to predict a probability of fraudulent financial-account access by providing a fraud probability score to each chronical-sequence of a preconfigured number of non-financial activities, provided in real-time.

* * * * *